United States Patent
Le et al.

(10) Patent No.: US 12,154,603 B1
(45) Date of Patent: Nov. 26, 2024

(54) SPIN-ORBIT TORQUE (SOT) WRITER WITH TOPOLOGICAL INSULATOR MATERIALS

(71) Applicants: Western Digital Technologies, Inc., San Jose, CA (US); Tokyo Institute of Technology, Tokyo (JP)

(72) Inventors: Quang Le, San Jose, CA (US); Brian R. York, San Jose, CA (US); Xiaoyong Liu, San Jose, CA (US); Cherngye Hwang, San Jose, CA (US); Hassan Osman, San Jose, CA (US); Hisashi Takano, Fujisawa (JP); Nam Hai Pham, Tokyo (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/361,631

(22) Filed: Jul. 28, 2023

Related U.S. Application Data

(60) Provisional application No. 63/472,944, filed on Jun. 14, 2023.

(51) Int. Cl.
  *G11B 5/37* (2006.01)
  *G11B 5/127* (2006.01)
(52) U.S. Cl.
  CPC ............ *G11B 5/372* (2013.01); *G11B 5/1278* (2013.01)
(58) Field of Classification Search
  None
  See application file for complete search history.

(56) References Cited

U.S. PATENT DOCUMENTS

| 5,751,521 A | 5/1998 | Gill |
| 6,657,823 B2 | 12/2003 | Kawato |
| 6,667,861 B2 | 12/2003 | Gill |
| 6,680,828 B2 | 1/2004 | Gill |

(Continued)

FOREIGN PATENT DOCUMENTS

| CN | 111354392 A | 6/2020 |
| JP | 2021034480 A | 3/2021 |

(Continued)

OTHER PUBLICATIONS

Berry et al. "Melting at dislocations and grain boundaries: A phase field crystal study," Physical Review, vol. B 77, No. 224114, 2008, pp. 224114-1-224114-5, DOI: 10.1103/PhysRevB.77.224114.

(Continued)

*Primary Examiner* — Fred Tzeng
(74) *Attorney, Agent, or Firm* — PATTERSON + SHERIDAN, LLP

(57) ABSTRACT

The present disclosure generally relates to a magnetic recording head comprising a spintronic device for magnetic media, such as a magnetic media drive. The spintronic device includes at least one spin Hall layer as well as at least one buffer layer and at least one interlayer. The buffer layer is positioned proximate a main pole of a write head while the interlayer is positioned proximate a trailing shield of the write head. The spin Hall layer is positioned between the buffer layer and the interlayer. The spintronic element may be disposed at the media facing surface (MFS) or recessed from the MFS. The spintronic device is capable of injecting spin current to the main pole, the trailing shield, or both.

21 Claims, 9 Drawing Sheets

(56) References Cited

U.S. PATENT DOCUMENTS

| | | | |
|---|---|---|---|
| 6,906,898 B2 | 6/2005 | Kawato | |
| 7,016,160 B2 | 3/2006 | Mao et al. | |
| 7,242,556 B2 | 7/2007 | Gill | |
| 7,298,595 B2 | 11/2007 | Gill | |
| 7,436,632 B2 | 10/2008 | Li et al. | |
| 7,643,255 B2 | 1/2010 | Gill et al. | |
| 7,697,242 B2 | 4/2010 | Gill | |
| 7,881,018 B2 | 2/2011 | Gill et al. | |
| 8,125,746 B2 | 2/2012 | Dimitrov et al. | |
| 8,174,799 B2 | 5/2012 | Hoshiya et al. | |
| 8,223,464 B2 | 7/2012 | Yasui et al. | |
| 8,553,346 B2 | 10/2013 | Braganca et al. | |
| 8,570,677 B2 | 10/2013 | Braganca et al. | |
| 8,570,689 B2 | 10/2013 | Sato et al. | |
| 8,654,465 B2 | 2/2014 | Braganca et al. | |
| 9,472,216 B1 | 10/2016 | Mauri et al. | |
| 9,806,710 B2 | 10/2017 | Flatte | |
| 9,929,210 B2 | 3/2018 | Lai et al. | |
| 9,947,347 B1 | 4/2018 | Van Der Heijden et al. | |
| 10,014,012 B1 | 7/2018 | Song et al. | |
| 10,127,933 B2 | 11/2018 | Batra et al. | |
| 10,210,888 B1* | 2/2019 | Li | G11C 11/18 |
| 10,403,309 B2* | 9/2019 | Li | H10N 50/10 |
| 10,483,457 B1 | 11/2019 | Lee et al. | |
| 10,490,731 B2 | 11/2019 | Sasaki et al. | |
| 10,650,847 B2* | 5/2020 | Li | G11B 5/374 |
| 10,720,570 B2 | 7/2020 | Le et al. | |
| 10,734,015 B1* | 8/2020 | Song | G11B 5/315 |
| 10,839,831 B1 | 11/2020 | Nguyen et al. | |
| 10,867,626 B1 | 12/2020 | Li et al. | |
| 10,891,976 B1* | 1/2021 | Song | G11B 5/1278 |
| 10,991,390 B2 | 4/2021 | Kobayashi | |
| 10,997,991 B2* | 5/2021 | Song | G11B 5/3906 |
| 11,088,200 B1 | 8/2021 | Xiao | |
| 11,094,338 B1 | 8/2021 | Hwang et al. | |
| 11,100,946 B1 | 8/2021 | Le et al. | |
| 11,205,446 B1* | 12/2021 | Li | G11B 5/02 |
| 11,222,656 B1 | 1/2022 | Le et al. | |
| 11,289,118 B1* | 3/2022 | Kaiser | G11B 5/1278 |
| 11,437,058 B2 | 9/2022 | Song et al. | |
| 11,495,741 B2 | 11/2022 | York et al. | |
| 11,532,323 B1 | 12/2022 | Le et al. | |
| 11,694,713 B2* | 7/2023 | Le | G11B 5/11 360/59 |
| 11,783,853 B1* | 10/2023 | Liu | G11B 5/11 360/324.2 |
| 2009/0161265 A1 | 6/2009 | Sugano et al. | |
| 2011/0089940 A1 | 4/2011 | Carey et al. | |
| 2014/0226239 A1 | 8/2014 | Mihajlovic et al. | |
| 2014/0254252 A1 | 9/2014 | Guo | |
| 2015/0041934 A1 | 2/2015 | Khvalkovskiy et al. | |
| 2015/0287426 A1 | 10/2015 | Mihajlovic et al. | |
| 2017/0077392 A1 | 3/2017 | Han et al. | |
| 2017/0098545 A1 | 4/2017 | Woodruff | |
| 2017/0221506 A1 | 8/2017 | Tan et al. | |
| 2017/0271581 A1 | 9/2017 | Seong et al. | |
| 2017/0288666 A1 | 10/2017 | Flatte | |
| 2017/0365777 A1 | 12/2017 | Mihajlovic et al. | |
| 2018/0166500 A1 | 6/2018 | Wang et al. | |
| 2018/0358543 A1 | 12/2018 | Le et al. | |
| 2018/0366172 A1 | 12/2018 | Wang et al. | |
| 2019/0037703 A1 | 1/2019 | Wang et al. | |
| 2019/0058113 A1 | 2/2019 | Ramaswamy et al. | |
| 2019/0279665 A1* | 9/2019 | Li | G11B 5/315 |
| 2019/0326353 A1 | 10/2019 | O'Brien et al. | |
| 2019/0392881 A1 | 12/2019 | Rakshit et al. | |
| 2020/0035910 A1 | 1/2020 | Li et al. | |
| 2020/0098410 A1 | 3/2020 | Gosavi et al. | |
| 2020/0176511 A1 | 6/2020 | Park et al. | |
| 2020/0243603 A1 | 7/2020 | Lee et al. | |
| 2020/0243752 A1 | 7/2020 | Sasaki | |
| 2020/0279992 A1 | 9/2020 | Pham et al. | |
| 2021/0056988 A1 | 2/2021 | Chen et al. | |
| 2021/0082458 A1* | 3/2021 | Li | G11B 5/3146 |
| 2021/0249038 A1 | 8/2021 | Le et al. | |
| 2021/0280208 A1* | 9/2021 | Song | G11B 5/1278 |
| 2021/0328134 A1 | 10/2021 | Guo et al. | |
| 2021/0336127 A1 | 10/2021 | Le et al. | |
| 2021/0351342 A1 | 11/2021 | Yui et al. | |
| 2021/0367142 A1 | 11/2021 | Lee et al. | |
| 2021/0408370 A1 | 12/2021 | York et al. | |
| 2022/0005498 A1 | 1/2022 | Le et al. | |
| 2022/0013138 A1 | 1/2022 | Hwang et al. | |
| 2022/0029090 A1 | 1/2022 | Cho et al. | |
| 2022/0044103 A1 | 2/2022 | Nguyen et al. | |
| 2022/0068538 A1 | 3/2022 | Apalkov et al. | |
| 2022/0069202 A1 | 3/2022 | Nguyen et al. | |
| 2022/0310901 A1 | 9/2022 | Oguz et al. | |
| 2023/0027086 A1 | 1/2023 | Le et al. | |
| 2023/0047223 A1 | 2/2023 | Le et al. | |
| 2023/0121375 A1 | 4/2023 | Le et al. | |
| 2023/0197132 A1 | 6/2023 | Le et al. | |
| 2023/0410840 A1* | 12/2023 | Freitag | G11B 5/314 |
| 2023/0410841 A1* | 12/2023 | Freitag | G11B 5/3146 |
| 2023/0419990 A1* | 12/2023 | Liu | G11B 5/3912 |

FOREIGN PATENT DOCUMENTS

| | | |
|---|---|---|
| JP | 2021057357 A | 4/2021 |
| JP | 2021128814 A | 9/2021 |
| WO | 2018231292 A1 | 12/2018 |
| WO | 2019054484 A1 | 3/2019 |
| WO | 2019125388 A1 | 6/2019 |
| WO | 2019159885 A1 | 8/2019 |
| WO | 2023022764 A1 | 2/2023 |

OTHER PUBLICATIONS

Buffat et al. "Size effect on the melting temperature of gold particles," Physical Review A, vol. 13, No. 6, Jun. 1976, pp. 2287-2298.

Cantwell et al. "Grain boundary complexions," ScienceDirect, Acta Materialia, vol. 62, No. 152, 2014, pp. 1-48, http://dx.doi.org/10.1016/j.actamat.2013.07.037.

Chi et al. "The Spin Hall Effect of Bi—Sb Alloys Driven by Thermally Excited Dirac-like Electronics," Oct. 28, 2019, ArXiv: 1910, 40 pages, https://arxiv.org/pdf/1910.12433.pdf.

Eustathopoulos "Wetting by Liquid Metals-Application in Materials Processing: The Contribution of the Grenoble Group," Metals, 2015, vol. 5, No. 1, pp. 350-370, doi: 10.3390/met5010350.

Fan et al. "Magnetization switching through giant spin-orbit torque in a magnetically doped topological insulator heterostructure," Nature Materials, vol. 13, Apr. 28, 2014, pp. 669-704, << https://doi.org/10.1038/nmat3973>>.

Frolov et al. "Structural phase transformations in metallic grain boundaries," Nature Communications, 2013, vol. 4, No. 1899, pp. 1-7, DOI: 10.1038/ncomms2919.

International Search Report and the Written Opinion for International Application No. PCT/US2020/065156 mailed Mar. 14, 2021, 13 pages.

International Search Report and the Written Opinion for International Application No. PCT/US2020/066902 mailed Apr. 18, 2021, 12 pages.

Khang et al. "A conductive topological insulator with large spin Hall effect for ultralow power spin-orbit torque switching," Nature Materials, vol. 17, pp. 808-813, Sep. 2018, pp. 808-813, https://doi.org/10.1038/s41563-018-0137-y.

Kogtenkova et al. "Grain Boundary Complexions and Phase Transformations in Al- and Cu-Based Alloys," Metals, 2019, vol. 9, No. 1, doi:10.3390/met9010010, 24 pages.

Roschewsky et al. "Spin-orbit torque and Nernst effect in Bi—Sb/Co heterostructures," Physical Review, vol. B 99, No. 195103, 2019, pp. 195103-1-195103-5, DOI: 10.1103/PhysRevB.99.195103.

Roschewsky et al. "Spin-Orbit Torque and Nernst Effect in BiSb/ Co Heterostructures," Center for Energy Efficient Electronics Science, University of California—Berkeley, 2018, 12 pages, https://e3s-center.berkeley.edu/wp-content/uploads/2018/11/43Theme-4_Roschewsky_2018E3Sretreat.pdf.

(56) References Cited

OTHER PUBLICATIONS

Shao "Spin-Orbit Torques in Topological Insultators," UCLA Electronic Theses and Dissertations; 2015; 76 pages, https://escholarship.org/content/qt3ds9792s/qt3ds9792s.pdf?t=nys_1b5&nosplash=32ac004cc5750a361e60ece735dd2752.

Shirokura et al. "Origin of the Giant Spin Hall Effect in BISb Topological Insulator," ArXiv: 1810; 27 pages, https://arxiv.org/ftp/arxiv/papers/1810/1810.10840.pdf.

Tanaka et al. "Thermodynamic Evaluation of Nano-Particle Binary Alloy Phase Diagrams," 2001, Zeitschrift für Metallkunde, vol. 92, No. 11, pp. 1236-1241, http: //hdl.handle.net/11094/26514.

Walker et al. "Composition-dependent structural transition in epitaxial Bi1-xSbx thin films on Si (111)," Physical Review Materials, vol. 3, 064201, Jun. 7, 2019, 8 pages.

Yao et al. "Influence of Crystal Orientation and Surface Termination on the Growth of BiSb thin films on GaAs Substrates," Accepted Manuscript, Journal of Crystal Growth, 2019, 24 pages, doi: https://doi.org/10.1016/j.jcrysgro.2019.01.041.

U.S. Appl. No. 17/401,856, filed Aug. 13, 2021.

U.S. Appl. No. 17/405,954, filed Aug. 18, 2021.

Teague "X-ray and Mossbauer spectroscopy studies of the silicon-antimony and bismuth-antimony alloys," 1971, Scholar's Mine, Doctoral Dissertations, University of Missouri-Rolla, 167 pages.

"A colossal breakthrough for topological spintronics," Tokyo Institute of Technology, Jul. 31, 2018, 4 pages, <https://www.titech.ac.jp/english/news/2018/042001.html>.

International Search Report and the Written Opinion for International Application No. PCT/US2021/033912 mailed Jul. 25, 2021, 9 pages.

Lau et al. "Spin-orbit torque switching without an external field using interlayer exchange coupling," Nature Nanotechnology, vol. 11, Sep. 2016, pp. 758-762, <https://doi.org/10.1038/nnano.2016.84>.

Han et al. "Self-Biased Differential Dual Spin Valve Readers for Future Magnetic Recording," IEEE Transactions on Magnetics, vol. 48, No. 5, May 2012, pp. 1770-1776, 10.1109/TMAG.2011.2169946.

International Search Report and the Written Opinion for International Application No. PCT/US2021/033197 mailed Jul. 12, 2021, 9 pages.

Kotb et al. "Study of spin transfer torque (STT) and spin orbit torque (SOT) magnetic tunnel junctions (MTJs) at advanced CMOS technology nodes," Electrical and Electronics Engineering: An International Journal, (ELELIJ) vol. 6, No. 1, Feb. 2017, pp. 1-9, 10.14810/elelij.2017.6101.

Yuan et al. "Readback Resolution of Differential Dual CPP Spin Valve Reader," IEEE Transactions on Magnetics, vol. 46, No. 6, Jun. 2010, pp. 1667-1670, 10.1109/TMAG.2010.2045106.

Tuo Fan et al. "Ultrahigh Efficient Spin-Orbit Torque Magnetization Switching in All-Sputtered Topological Insulator—Ferromagnet Multilayer", Jul. 5, 2020, <https://arxiv.org/ftp/arxiv/papers/2007/2007.02264.pdf>.

International Search Report and Written Opinion for International Application No. PCT/US2022/027960 dated Sep. 5, 2022.

Zhang et al., "Different types of spin currents in the comprehensive materials database of nonmagnetic spin Hall effect", NPJ Computational Materials, 2021, 167, pp. 1-7, (Year: 2021).

Demasius, Kai-Uwe, et al. "Enhanced spin-orbit torques by oxygen incorporation in tungsten films." Nature communications 7.1 (2016): 1-7.

International Search Report and Written Opinion dated Nov. 16, 2022 for Application No. PCT/US2022/035654.

Manchon, A. et al. "Theory of nonequilibrium intrinsic spin torque in a single nanomagnet," Phys. Rev. B, vol. 78, 212405, Dec. 2008.

* cited by examiner

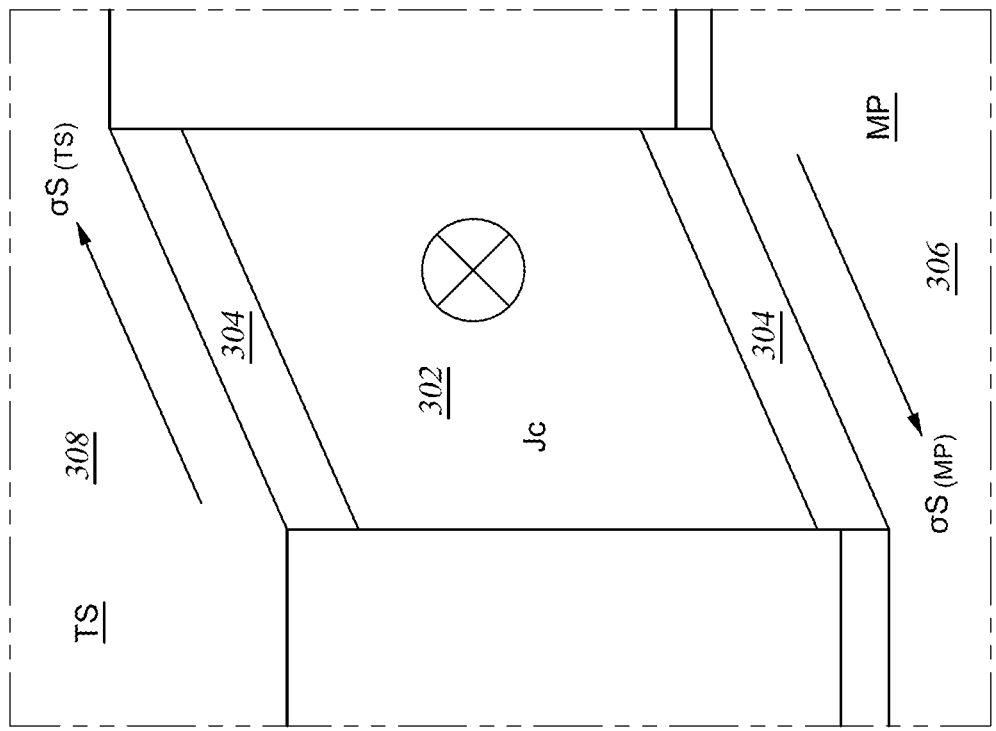
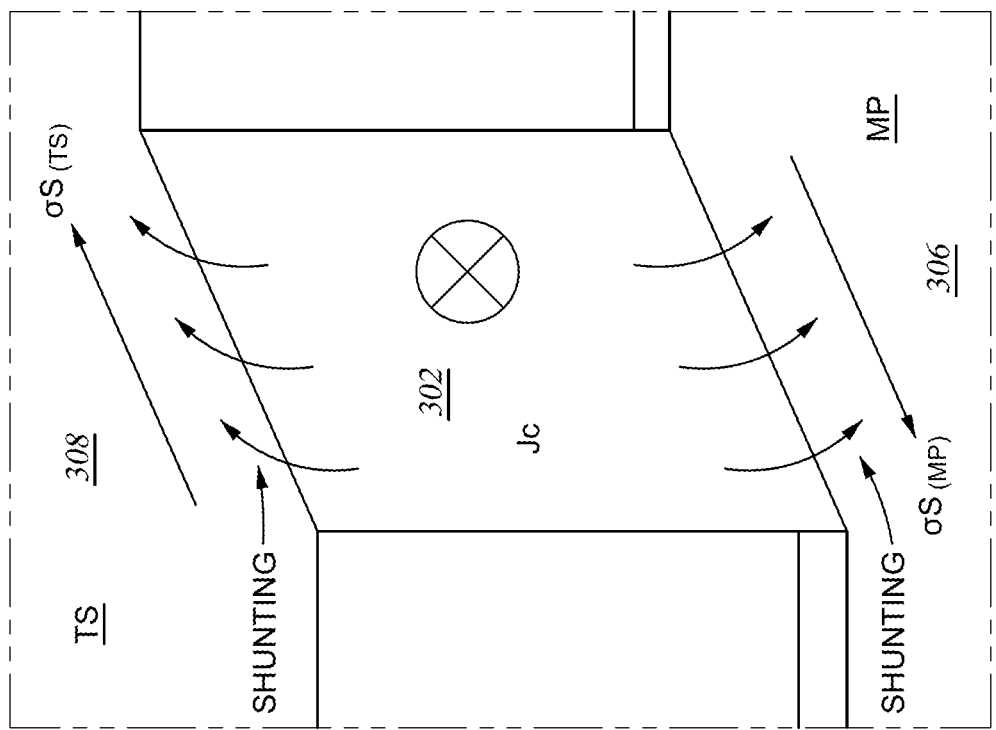
Fig. 3A
Fig. 3B

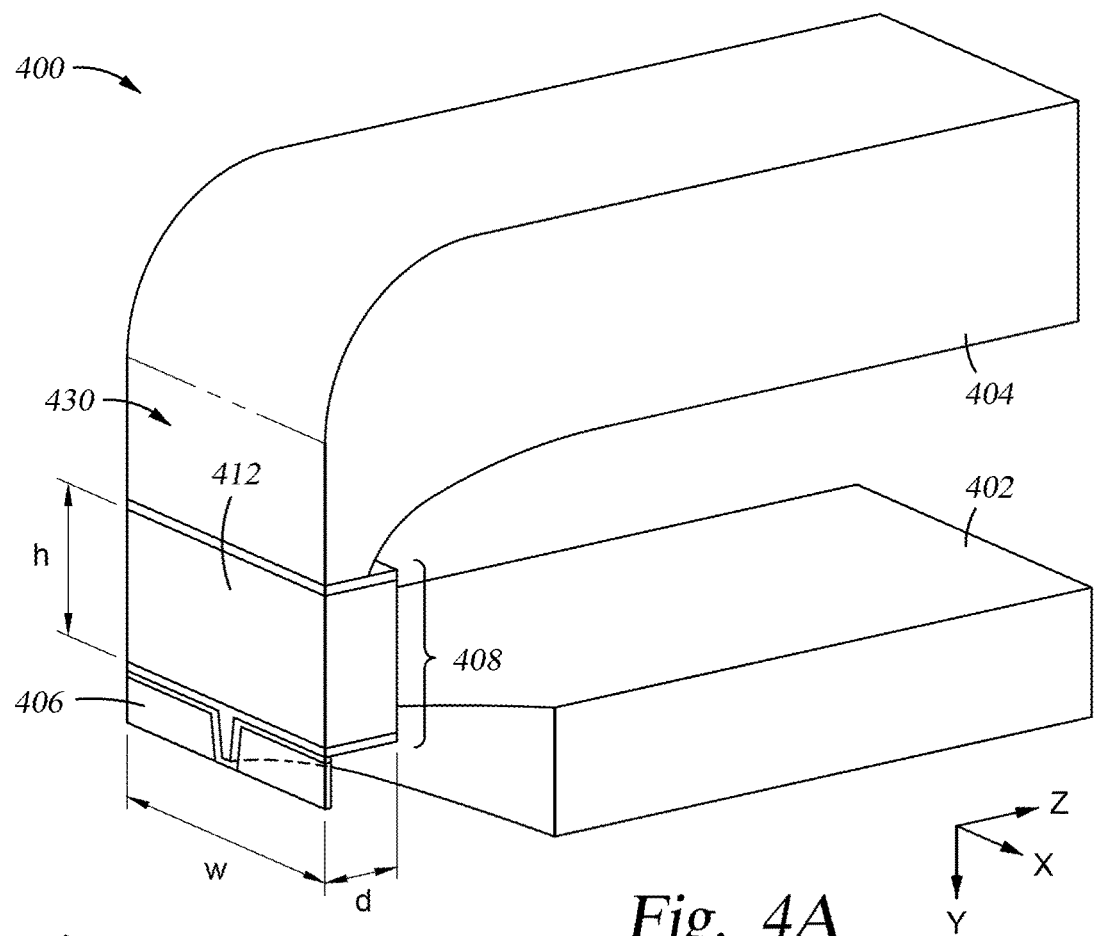
*Fig. 4A*
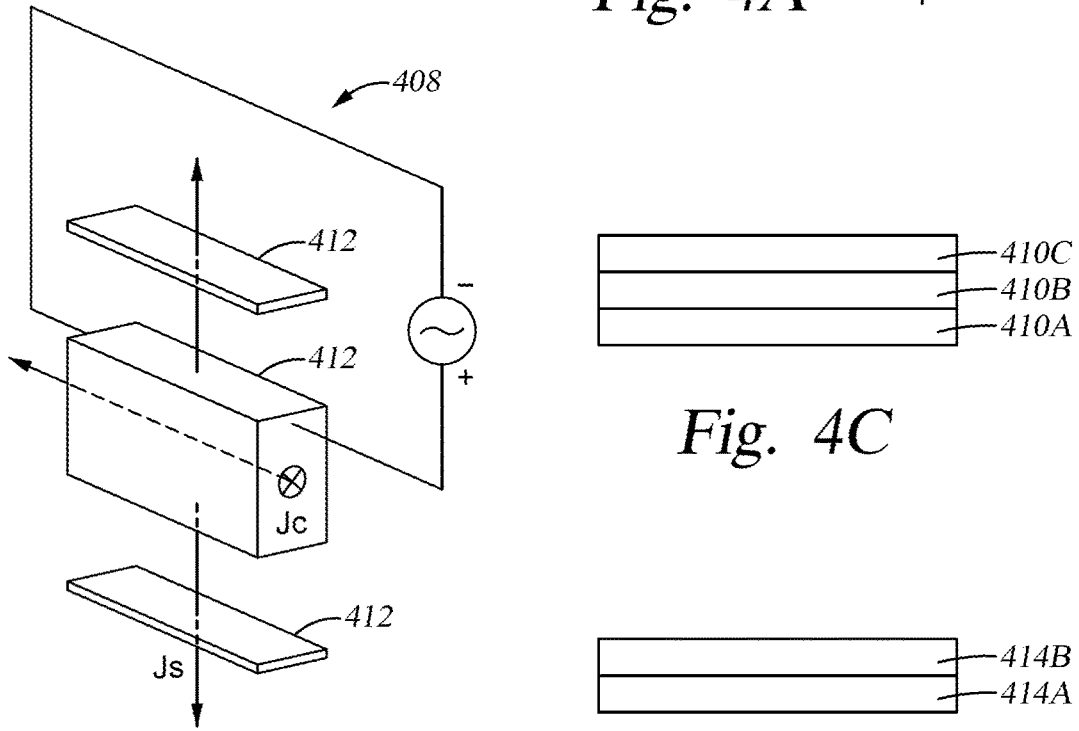
*Fig. 4B*  *Fig. 4C*  *Fig. 4D*

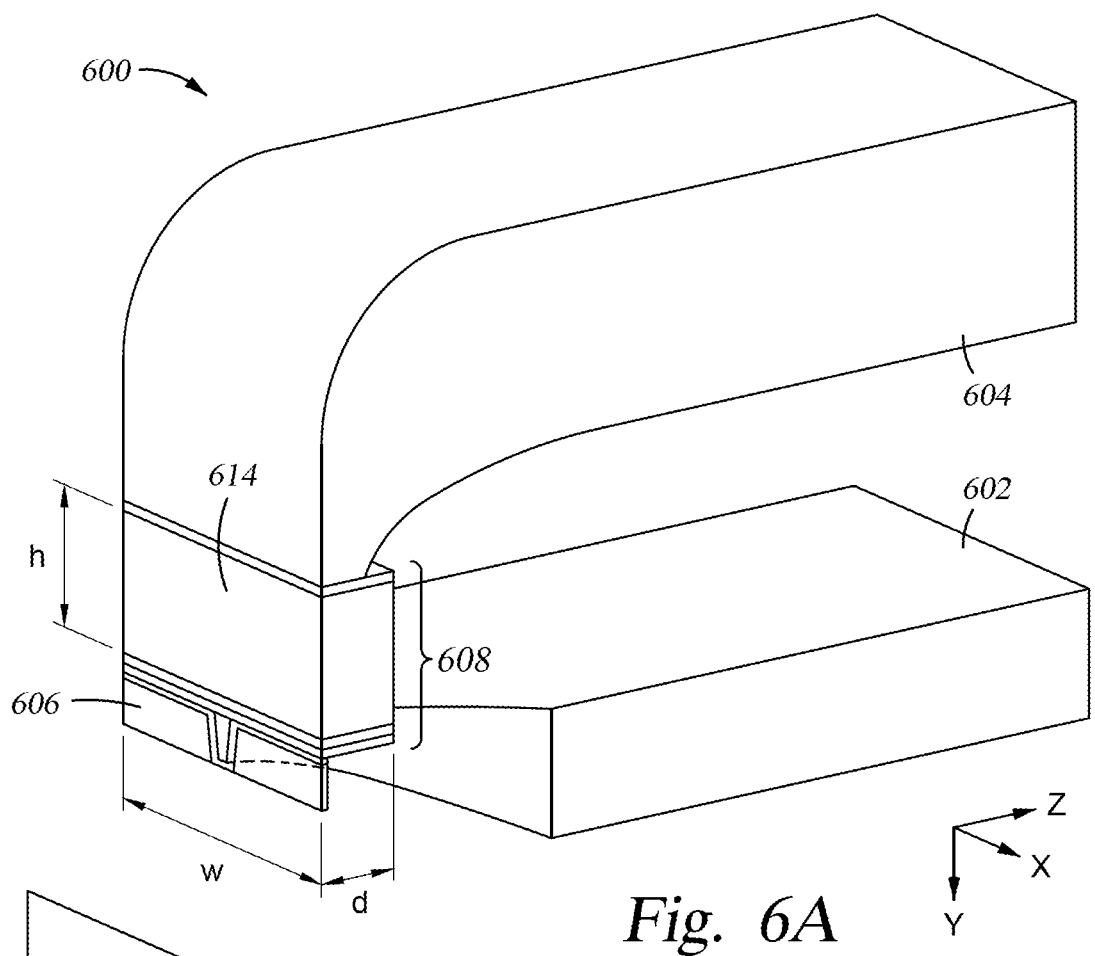
Fig. 6A
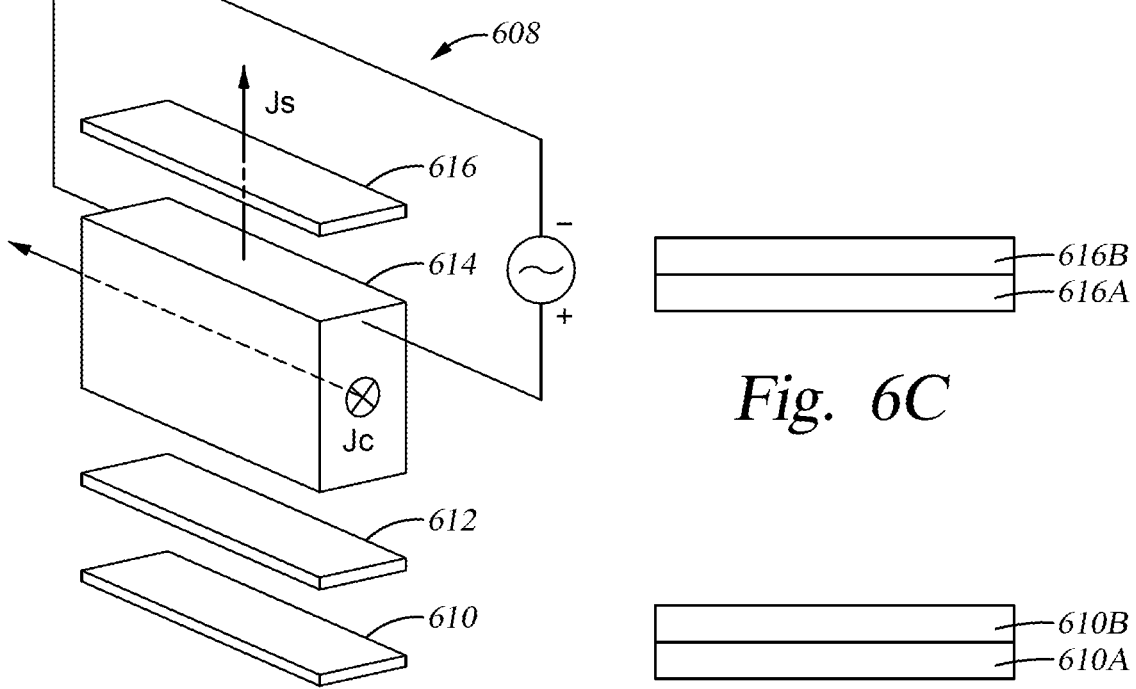
Fig. 6B
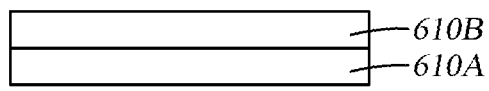
Fig. 6C
Fig. 6D

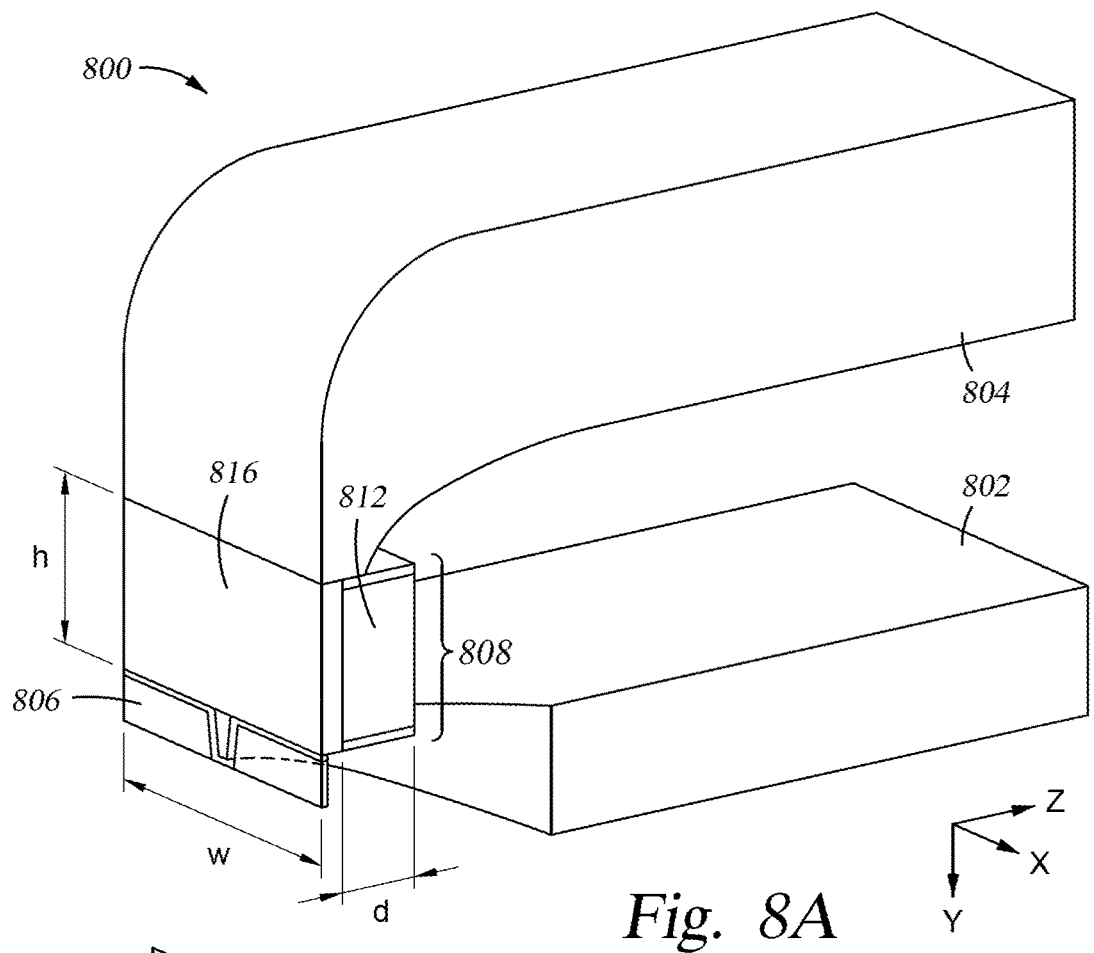
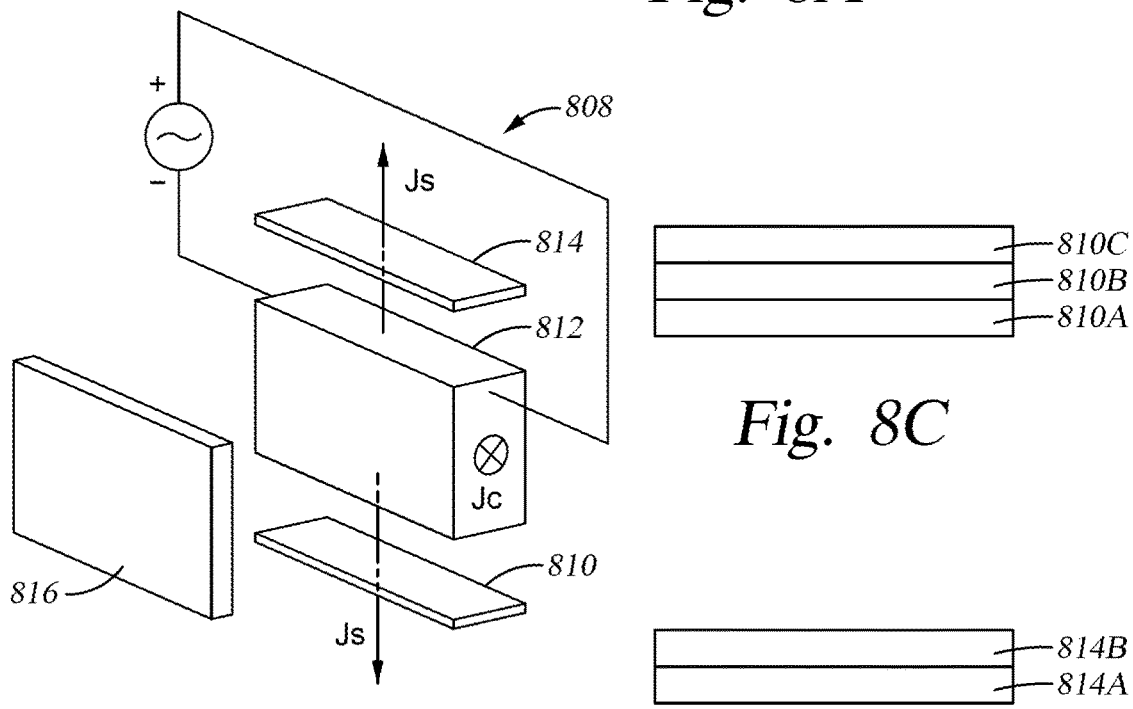
Fig. 8A
Fig. 8B
Fig. 8C
Fig. 8D

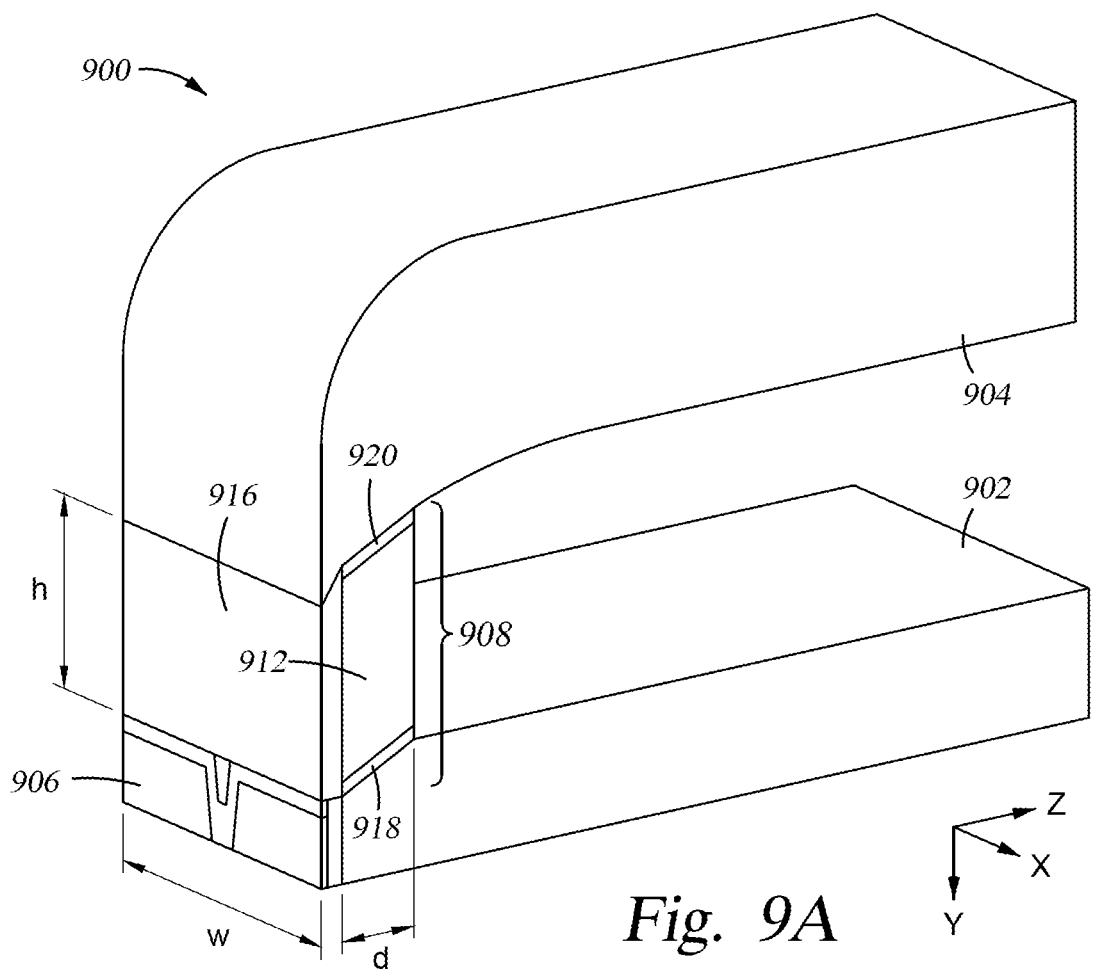
Fig. 9A
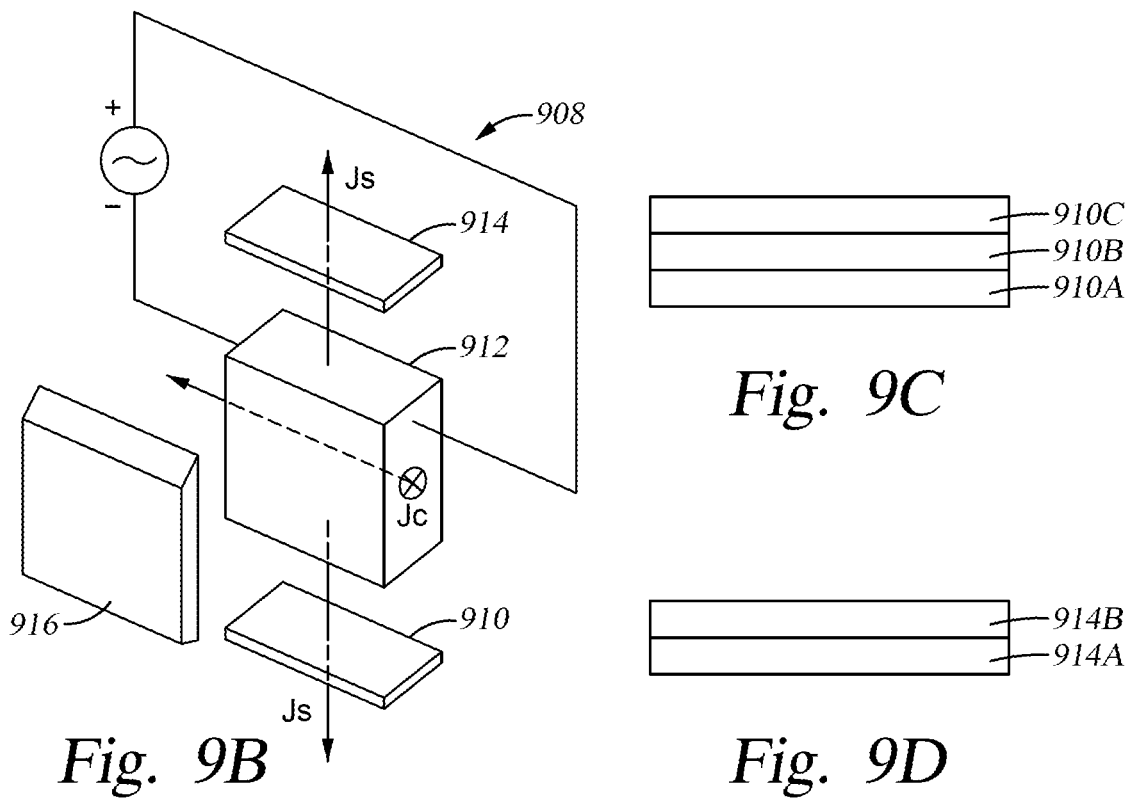
Fig. 9B
Fig. 9C
Fig. 9D

SPIN-ORBIT TORQUE (SOT) WRITER WITH TOPOLOGICAL INSULATOR MATERIALS

CROSS-REFERENCE TO RELATED APPLICATIONS

This application claims benefit of U.S. Provisional Patent Application Ser. No. 63/472,944, filed Jun. 14, 2023, which is herein incorporated by reference.

BACKGROUND OF THE DISCLOSURE

Field of the Disclosure

Embodiments of the present disclosure generally relate to a magnetic recording head comprising a spintronic device for magnetic media, such as a magnetic media drive or magnetic disk drive.

Description of the Related Art

At the heart of a computer is a magnetic disk drive. Information is written to and read from a disk as the disk rotates past read and write heads that are positioned very closely to the magnetic surface of the disk. Microwave-assisted magnetic recording (MAMR) is a type of energy-assisted recording technology to improve the recording density of a magnetic recording medium.

In MAMR, a spintronic device is located near the write element to produce a high-frequency AC field. The AC field reduces an effective coercivity of a magnetic recording medium, allowing writing at lower magnetic writing fields from the write pole. Due to the lower magnetic writing fields, higher recording density of the magnetic recording medium may be achieved through MAMR. More generally, various energy-assisted recording approaches based on spintronic effects are being explored, and there is a need in the art for improved spintronic devices for use in magnetic recording devices.

SUMMARY OF THE DISCLOSURE

The present disclosure generally relates to a magnetic recording head comprising a spintronic device for magnetic media, such as a magnetic media drive. The spintronic device includes at least one spin Hall layer as well as at least one buffer layer and at least one interlayer. The buffer layer is positioned proximate a main pole of a write head while the interlayer is positioned proximate a shield of the write head. The spin Hall layer is positioned between the buffer layer and the interlayer. The spintronic element may be disposed at the media facing surface (MFS) or recessed from the MFS. The spintronic device is capable of injecting spin current to the main pole, the shield, or both.

In one embodiment, a magnetic recording head comprises: a main pole; a shield; and a spintronic device disposed between the main pole and the shield. The spintronic device includes: a buffer layer disposed over the main pole, wherein the buffer layer comprises materials selected from the group consisting of Group B, Group C, Group D, Group E, Group F, Group G, and Group H; a spin Hall layer disposed over the buffer layer, wherein the spin Hall layer comprises undoped BiSb or doped BiSbX where X is a dopant; and an interlayer disposed over the spin Hall layer, wherein the interlayer comprises materials selected from the group consisting of Groups B, C, D, E, F, G, and H. Group B comprises face centered cubic (FCC) oxide materials. Group C comprises materials that can be deposited as amorphous to nanocrystalline thin films depending upon deposition conditions with a resistivity of greater than 100 micro ohm-cm. Group D comprises nonmagnetic Heusler materials including $Fe_2VAl$, $Cr_2CoAl$, $CoTiSb$, $Mn_2VSi$, $V_2Al$, $[Mn_{0.5}Co_{0.5}]_2VAl$, $[Mn_{0.75}Co_{0.25}]_2VSi$, $CoMnNbAl$, $CoZrFeAl$, and $Ti2MnAl$. Group E comprises crystalline high polarization layers using magnetic alloys or Heusler alloys that have large spin polarizations and do not readily mix with a spin Hall layer. Group F comprises amorphous nonmagnetic high resistive electrical shunt block layers that do not promote strong (012) BiSbX texture or growth. Group G comprises any metal amorphous or ceramic amorphous material with a nearest neighbor x-ray diffraction peak in a 2.19 A to 2.02 A d-spacing range. Group H comprises high perpendicular magnetic anisotropy (PMA) materials that can be amorphous or crystalline materials.

In another embodiment, a magnetic head comprises: a main pole; a shield; and a spintronic device disposed between the main pole and the shield, wherein the spintronic device comprises: a first buffer layer; a first spin Hall layer disposed over the buffer layer, wherein the first spin Hall layer comprises undoped BiSb or doped BiSbX where X is a dopant; a first interlayer disposed on the first spin Hall layer; an insulating layer disposed on the first interlayer; a second buffer layer disposed on the insulating layer; a second spin Hall layer disposed over the second buffer layer, wherein the second spin Hall layer comprises undoped BiSb or doped BiSbX where X is a dopant; and a second interlayer disposed on the second spin Hall layer.

In another embodiment, a magnetic head comprises: a main pole; a shield; a spintronic device disposed between the main pole and the shield, wherein the spintronic device comprises: a buffer layer; a spin Hall layer disposed over the buffer layer, wherein first spin Hall layer comprises undoped BiSb or doped BiSbX where X is a dopant; and a interlayer disposed on first spin Hall layer; and an insulating layer disposed between the spintronic device and either the main pole or the shield.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 3A and 3B are schematic, cross sectional views of a write head according to various embodiments.

FIG. 4A is a schematic illustration of a write head according to one embodiment. FIG. 4B is an exploded view of the spintronic device of the write head of FIG. 4A. FIG. 4C is a schematic illustration of a multilayer buffer layer according to one embodiment. FIG. 4D is a schematic illustration of a multilayer interlayer according to one embodiment.

FIG. 6A is a schematic illustration of a write head according to another embodiment. FIG. 6B is an exploded view of the spintronic device of the write head of FIG. 6A. FIG. 6C is a schematic illustration of a multilayer interlayer according to one embodiment. FIG. 6D is a schematic illustration of a multilayer insulating layer according to one embodiment.

FIG. 8A is a schematic illustration of a write head according to another embodiment. FIG. 8B is an exploded view of the spintronic device of the write head of FIG. 8A. FIG. 8C is a schematic illustration of a multilayer buffer layer according to one embodiment. FIG. 8D is a schematic illustration of a multilayer interlayer according to one embodiment.

FIG. 9A is a schematic illustration of a write head according to another embodiment. FIG. 9B is an exploded view of the spintronic device of the write head of FIG. 9A. FIG. 9C is a schematic illustration of a multilayer buffer layer according to one embodiment. FIG. 9D is a schematic illustration of a multilayer interlayer according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a magnetic recording head comprising a spintronic device for magnetic media, such as a magnetic media drive. The spintronic device includes at least one spin Hall layer as well as at least one buffer layer and at least one interlayer. The buffer layer is positioned proximate a main pole of a write head while the interlayer is positioned proximate a trailing shield of the write head. The spin Hall layer is positioned between the buffer layer and the interlayer. The spintronic element may be disposed at the media facing surface (MFS) or recessed from the MFS. The spintronic device is capable of injecting spin current to the main pole, the trailing shield, or both.

Figure 1:
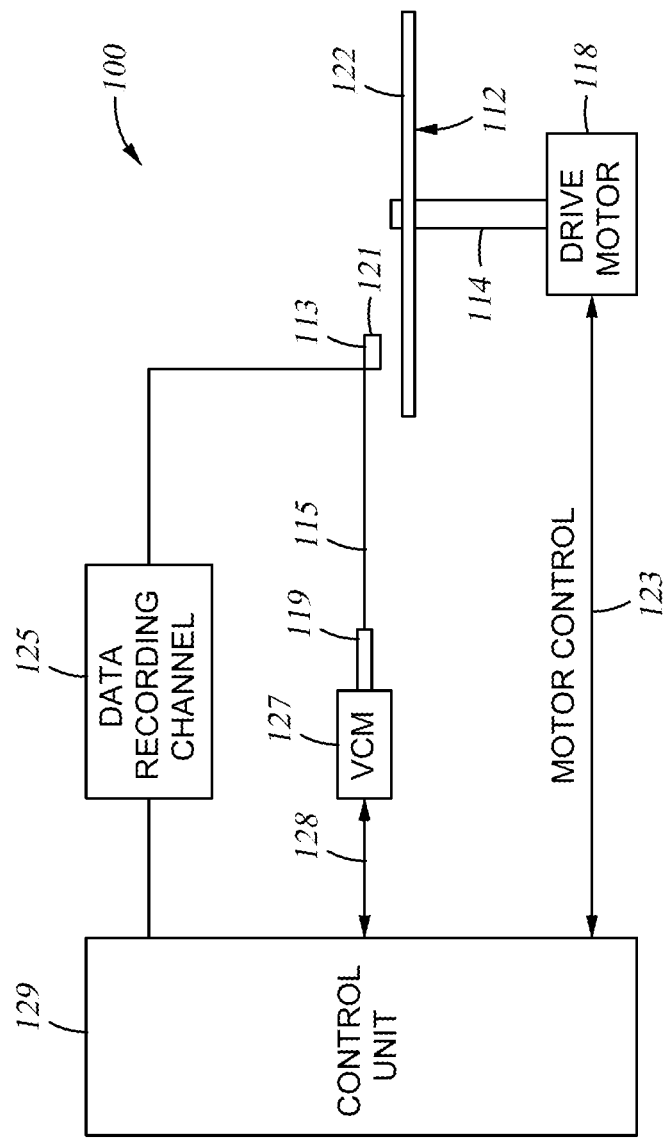
FIG. 1 illustrates a disk drive embodying this disclosure.

FIG. 1 is a schematic illustration of a magnetic recording device 100, according to one implementation. The magnetic recording device 100 includes a magnetic recording head, such as a write head. The magnetic recording device 100 is a magnetic media drive, such as a hard disk drive (HDD). Such magnetic media drives may be a single drive/device or include multiple drives/devices. For the ease of illustration, a single disk drive is shown as the magnetic recording device 100 in the implementation illustrated in FIG. 1. The magnet recording device 100 (e.g., a disk drive) includes at least one rotatable magnetic disk 112 supported on a spindle 114 and rotated by a drive motor 118. The magnetic recording on each rotatable magnetic disk 112 is in the form of any suitable patterns of data tracks, such as annular patterns of concentric data tracks on the rotatable magnetic disk 112.

At least one slider 113 is positioned near the rotatable magnetic disk 112. Each slider 113 supports a head assembly 121. The head assembly 121 includes one or more magnetic recording heads (such as read/write heads), such as a write head including a spintronic device. As the rotatable magnetic disk 112 rotates, the slider 113 moves radially in and out over the disk surface 122 so that the head assembly 121 may access different tracks of the rotatable magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by a control unit 129.

The head assembly 121, such as a write head of the head assembly 121, includes a media facing surface (MFS) such as an air bearing surface (ABS) that faces the disk surface 122. During operation of the magnetic recording device 100, the rotation of the rotatable magnetic disk 112 generates an air or gas bearing between the slider 113 and the disk surface 122 which exerts an upward force or lift on the slider 113. The air or gas bearing thus counter-balances the slight spring force of suspension 115 and supports the slider 113 off and slightly above the disk surface 122 by a small, substantially constant spacing during operation.

The various components of the magnetic recording device 100 are controlled in operation by control signals generated by control unit 129, such as access control signals and internal clock signals. The control unit 129 includes logic control circuits, storage means and a microprocessor. The control unit 129 generates control signals to control various system operations such as drive motor control signals on a line 123 and head position and seek control signals on a line 128. The control signals on line 128 provide the desired current profiles to optimally move and position slider 113 to the desired data track on rotatable magnetic disk 112. Write and read signals are communicated to and from the head assembly 121 by way of recording channel 125. In one embodiment, which can be combined with other embodiments, the magnetic recording device 100 may further include a plurality of media, or disks, a plurality of actuators, and/or a plurality number of sliders.

Figure 2:
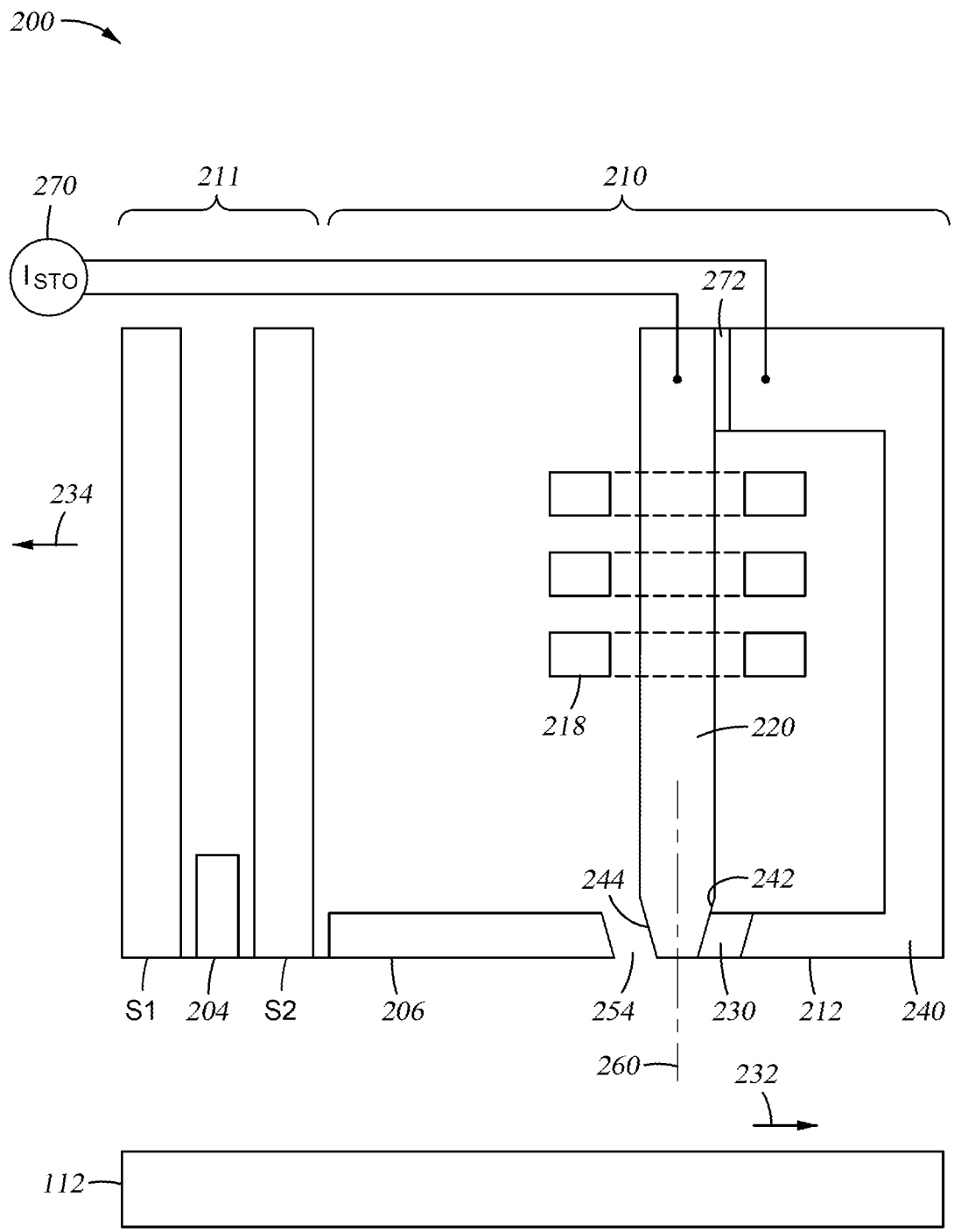
FIG. 2 is a fragmented, cross-sectional side view through the center of a read/write head facing a magnetic media, according to one embodiment.

FIG. 2 is a schematic illustration of a cross sectional side view of a head assembly 200 facing the rotatable magnetic disk 112 shown in FIG. 1 or other magnetic storage medium, according to one implementation. The head assembly 200 may correspond to the head assembly 121 described in FIG. 1. The head assembly 200 includes a MFS 212, such as an ABS, facing the rotatable magnetic disk 112. As shown in FIG. 2, the rotatable magnetic disk 112 relatively moves in the direction indicated by the arrow 232 and the head assembly 200 relatively moves in the direction indicated by the arrow 233.

In one embodiment, which can be combined with other embodiments, the head assembly 200 includes a magnetic read head 211. The magnetic read head 211 may include a sensing element 204 disposed between shields S1 and S2. The sensing element 204 is a magnetoresistive (MR) sensing element, such an element exerting a tunneling magneto-resistive (TMR) effect, a magneto-resistance (GMR) effect, an extraordinary magneto-Resistive (EMR) effect, or a spin torque oscillator (STO) effect. The magnetic fields of magnetized regions in the rotatable magnetic disk 112, such as perpendicular recorded bits or longitudinal recorded bits, are detectable by the sensing element 204 as the recorded bits.

The head assembly 200 includes a write head 210. In one embodiment, which can be combined with other embodiments, the write head 210 includes a main pole 220, a leading shield 206, a trailing shield (TS) 240, and a spintronic device 230 disposed between the main pole 220 and the TS 240. Each of the main pole 220, the spintronic device 230, the leading shield 206, and the TS 240 has a front portion at the MFS. It is noted that while the various embodiments are illustrated with the spintronic device 230 (in the form of SOT based devices) in the gap between the main pole 220 and the TS 240, the spintronic device 230 can be placed between the main pole 220 and other shields of the main pole (e.g., side shield or leading shield). Thus, any mention of trailing shield below can be substituted with other shields such as leading or side shields. Such trailing shield implementations are provided for illustrative examples and not intended to limit the scope of the embodiments.

The main pole 220 includes a magnetic material, such as CoFe, CoFeNi, NiFe or FeNiRe, other suitable magnetic materials. In one embodiment, which can be combined with other embodiments, the main pole 220 includes small grains of magnetic materials in a random texture, such as body-centered cubic (BCC) materials formed in a random texture. In one example, a random texture of the main pole 220 is formed by electrodeposition. The write head 210 includes a coil 218 around the main pole 220 that excites the main pole 220 to produce a writing magnetic field for affecting a magnetic recording medium of the rotatable magnetic disk 112. The coil 218 may be a helical structure or one or more sets of pancake structures.

In one embodiment, which can be combined with other embodiments, the main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree or different degree of taper with respect to a longitudinal axis 260 of the main pole 220. In one embodiment, which can be combined with other embodiments, the main pole 220 does not include the trailing taper 242 and the leading taper 244. In such an embodiment, the main pole 220 includes a trailing side and a leading side in which the trailing side and the leading side are substantially parallel.

The TS 240 includes a magnetic material, such as FeNi, or other suitable magnetic materials, serving as a second electrode and return pole for the main pole 220. The leading shield 206 may provide electromagnetic shielding and is separated from the main pole 220 by a leading gap 254.

In some embodiments, the spintronic device 230 is based on the SHE, and is positioned proximate the main pole 220 to assist the writing. In such embodiments, an electron current is applied to spintronic device 230 from a current source 270.

Spin orbit torque (SOT) from a direct spin Hall layer, also referred to as a spin Hall effect (SHE) layer, provides this assistance to the main pole or trailing shield. An in plane current (CIP) in the SHE layer causes a spin current generated perpendicular to the plane, and accumulated at the top and bottom surfaces of the SHE layer. A magnetic layer (e.g., main pole or trailing shield) in contact with the SHE layer will experience a torque transverse to CIP which may be useful to magnetize the write poles to help improve write-ability. The torque transverse to the CIP assists in the fast switching of the main pole because the main pole will magnetize faster for fast switching and will thus improve write-ability due to the torque transverse to CIP.

FIGS. 3A and 3B are schematic, cross sectional views of a write head according to various embodiments. As shown in FIG. 3A, an electrical current (Jc) is injected into the spin Hall layer 302 perpendicular to an axis extending between the main pole 306 and the trailing shield 308. Because the spin Hall layer 302 is in direct contact with both the main pole 306 and the trailing shield 308, there will be some current shunting occurring such that not 100% of Jc flows inside SHL layer 302. By inserting a spin blocking layer (SBL) 304 shown in FIG. 3B having a high resistivity between the trailing shield 308 and the spin Hall layer 302, as well as between the main pole 306 and the spin Hall layer 302, shunting is blocked because the SBL's 304 resistivity is higher than that of the SHE material. The SBL 304 is magnetic, in one embodiment, to achieve SOT with the SHE material and/or exchange coupling to the trailing shield 308 or main pole 306.

FIG. 4A is a schematic illustration of a write head 400 according to one embodiment. FIG. 4B is an exploded view of the spintronic device of the write head 400 of FIG. 4A. The write head 400 includes a main pole 402, a trailing shield 404, and side shields 406. The spintronic device 408 is disposed between the main pole 402 and the trailing shield 404. The spintronic device 408 includes a buffer layer 410, a spin Hall layer 412, and an interlayer 414.

The spintronic device 408 is at the MFS 430, as is the trailing shield 404, main pole 402, and side shields 406. In particular, the buffer layer 410, the spin Hall layer 412, and the interlayer 414 each has a surface at the MFS. The surfaces at the MFS have a width w extending in the "X" direction and a height h extending in the "Y" direction, while the individual layers of the spintronic device also have a depth d extending in the "Z" direction. The depth is the dimension into the head perpendicular to the MFS. The height is the dimension that extends between the main pole 402 and the trailing shield 404. The width is the dimension that is perpendicular to the height along the MFS. As shown in FIGS. 4A and 4B, the buffer layer 410, the spin Hall layer 412, and the interlayer 414 all have the same depth and width though it is contemplated that the buffer layer 410, the spin Hall layer 412, and the interlayer 414 may have different widths and depths. Additionally, the buffer layer 410, the spin Hall layer 412, and the interlayer 414 are shown to have different heights, but it is contemplated that the buffer layer 410, the spin Hall layer 412, and the interlayer 414 may have identical heights.

During operation, current (Jc) is injected into the Spin Hall layer 412 and flows transverse to the plane and spin accumulates on the top and bottom of the spin Hall layer from the SHE. The spin current (Js) naturally occurs and flows to the trailing shield 404 and the main pole 402. The interlayer 414 and the buffer layer 410 optimize the spin Hall layer for (012) orientation and in the meantime minimize diffusion and roughness, which enhances the torque caused by the spin Hall layer on the trailing shield 404 and main pole 402, which improves write-ability.

Numerous materials may be utilized for the spintronic device to provide a textured spin Hall layer (012) growth using either textures (100) or as amorphous seed layers. One group of materials, Group A, includes body centered cubic (BCC) materials such as V, $V_3Al$, $Mn_3Al$, Nb, Mo, W, Ta, $WTi_{50}$, or a BCC material used in combination with (100) textured layers such as Cr (heated~250° C. or larger), RuAl, IrAl, CoAl, B2 phases, NiAl—B2 phase, CrMo (Mo~20-50 at. %)-A2,B2 phase, A2 CrX (X is about at. 10%, heated~250° C. or larger, and is selected from Ru, Ti, W, and Mo).

The Group A materials provide texturing for subsequent layers and may be referred to as a MgO (100) texturing layer stack. Generally speaking, depositing a high boron affinity elements or alloys such as alloys of tantalum, tungsten, or titanium and then depositing a magnetic layer containing boron, an amorphous magnetic layer material such as cobalt iron boron or cobalt boron is formed, but the boron would be pulled out leaving a magnetic cobalt iron or cobalt layer behind. On top of that layer, MgO could be formed with a (100) texture. Other manners to make MgO (100) can include depositing heated chromium or ruthenium aluminum grow in a textured fashion. MgO (100) texturing layer stacks can also be made by depositing thin MgO on a magnetic bilayer of Co, or CoFe on a magnetic boron alloy of CoFeB or CoB deposited on a thin high B gettering alloy seed layers of Hf, Ta, W, Ti, or alloys containing these elements.

Another group of materials, Group B, includes face centered cubic (FCC) oxide materials including FeO, CoO, NiO, ZrO, MgO, TiO, MgTiO, and MnO. Another group of materials, Group C, includes FCC nitrides and carbides including ScN, TIN, NbN, ZrN, HfN, TaN, VN, CrN, ScC, TiC, NbC, ZrC, HfC, TaC, WC, VC, and $W_{0.8}Zr_{0.2}C$. Group C materials can be deposited as amorphous to nanocrystalline thin films depending upon deposition conditions. Resistivities of Group C materials are >100-200 micro ohm-cm.

Another groups of materials, Group D, includes nonmagnetic Heusler materials including $Fe_2VAl$, $Cr_2CoAl$, CoTiSb, $Mn_2VSi$, $V_2Al$, $[Mn_{0.5}Co_{0.5}]_2VAl$, $[Mn_{0.75}Co_{0.25}]_2VSi$, CoMnNbAl, CoZrFeAl, and Ti2MnAl. Another group of materials, Group E, are crystalline high polarization layers using magnetic alloys or Heusler alloys that have large spin polarizations and do not readily mix with a spin Hall layer including: $Co_2MnSb$, CoFex, NiFeX (X=Si, Al, Mn, or Ge), CoFe, NiFe, $Co_2MnGe$, CoMnSb, NiMnSb, $Co_2FeGe$, $Co_2MnSn$, and $Co_2MnFeGe$.

Another group of materials, Group F, includes amorphous nonmagnetic high resistive electrical shunt block layers that do not promote strong (012) BiSbX texture or growth. They include $SiO_2$, $Al_2O_3$, SiN, AlN, SiC, SiCrOx, NiX, FeX, and Cox, where X can be one or more of these elements including Fe, Co, Ni, Ta, Hf, W, Ir, Pt, Ti, Zr, N, Ru, Ge and B.

Another group of materials, Group G, includes any metal amorphous or ceramic amorphous material with the nearest neighbor x-ray diffraction peak in the 2.19 A to 2.02 A d-spacing range. Such materials include nonmagnetic and magnetic materials from Group A, D, or E which are laminated or alloyed with one or more elements of: Cu, Ag, Ge, Al, Mg, Si, Mn, Ni, Co, Mo, Zr, Y, Bi, Hf, Ta, W, Ir, Pt, Ti, or B. They form effectively nonmagnetic amorphous layers which produce amorphous materials or start with amorphous materials like a-Ge, and a-NiP etc. Group G also may include amorphous/nanocrystalline alloys with a-Ge, a-NiP and one or more elements of: Cu, Ag, Ge, Al, Mg, Si, Mn, Ni, Co, Mo, Zr, Y, Bi, Hf, Ta, W, Ir, Pt, Ti, or B to promote a strong (012) BiSb texture.

Yet another group of materials, Group H, are high perpendicular magnetic anisotropy (PMA) materials that can be amorphous or crystalline materials. Amorphous rare-earth transition metals (RE-TM) that have high PMA like TbFeCo, TbFeB, Nd, Pr, Sm(Fe,Co)B, or heavy metals like CoZrTaB, can be used. This multilayer polycrystalline stacks of Co/Pt, Co/Pd, CoFe/Pt, Co/Tb, or CoFe/Tb ("/" denoting separation of layers in a multilayer stack), or single layer PMA materials like CoPt, CoPtCr, CoFePt, and FePt with high Ku, can be used with an amorphous high polarizing layer next to the spin Hall layer for (012) texture growth.

In the embodiment of FIGS. 4A and 4B, the buffer layer 410 may have extend from the MFS into the pole and across the pole. The buffer layer 410 may comprise materials from Groups B, C, D, E, F, G, and H. In one embodiment, the buffer layer 410 may be a multilayer structure as shown in FIG. 4C where the lowermost layer 410A adjacent the main pole 402 comprises materials from Group D, E or H; the middle layer 410B adjacent the lowermost layer 410A comprises materials from Group B, C, F, or G; and the uppermost layer 410C adjacent the spin Hall layer 412 includes materials from Group G.

The interlayer 414 may comprise materials from Groups B, C, D, E, F, G, and H. In one embodiment, the interlayer 414 may be a multilayer structure as shown in FIG. 4D where the lowermost layer 414A adjacent the spin Hall layer 412 comprises materials from Group B, C, E, F, or G; and the uppermost layer 414B adjacent the trailing shield 404 includes materials from Groups D, E or H.

The spin Hall layer 412 may comprise undoped BiSb or doped BiSbX, where the dopant is less than about 10 at. %, and where X is extracted from elements which do not readily interact with Bi, such as B, N, Al, Si, Ti, V, Cr, Fe, Ni, Cu, Ge, Y, Zr, Ru, Mo, Ag, Hf, Ta, W, or Ir or in alloy combinations with one or more of aforementioned elements, like CuAg, CuNi, RuGe, etc. The spin Hall layer 412 may have a (012) crystal orientation.

Figure 5A:
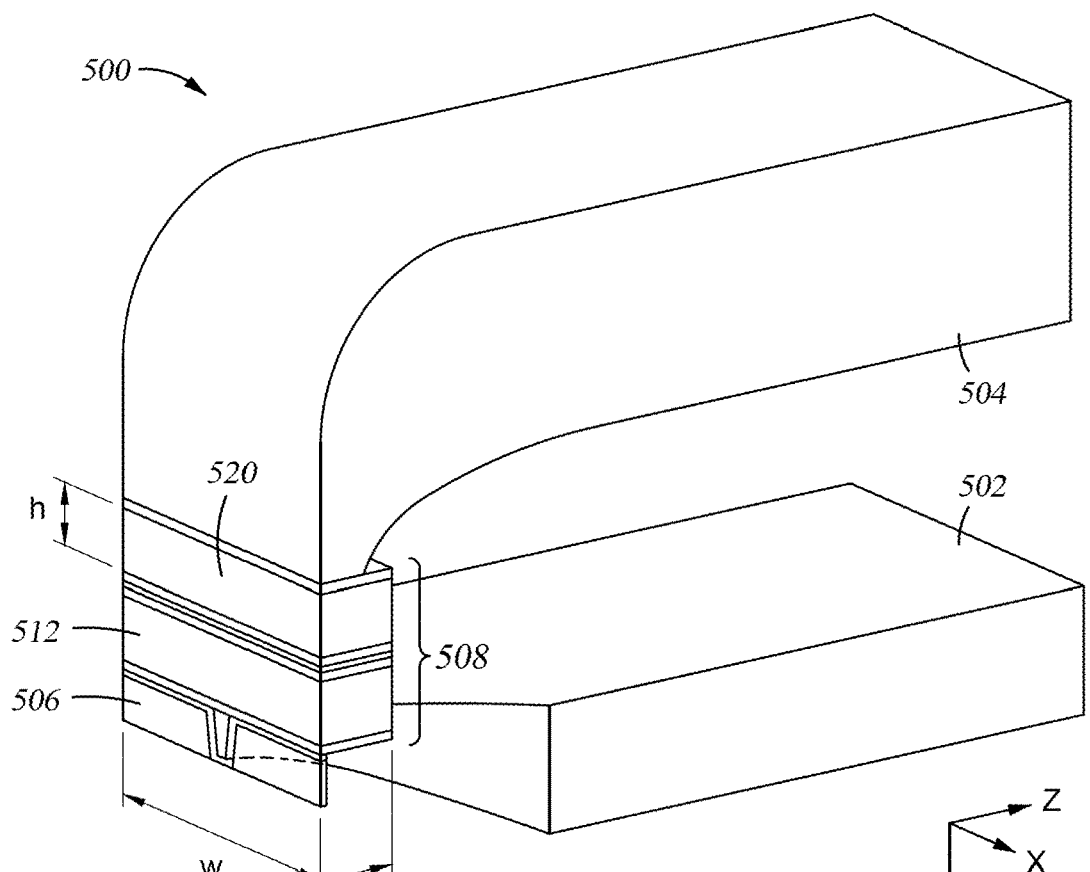
FIG. 5A is a schematic illustration of a write head according to another embodiment.
Figure 5B:
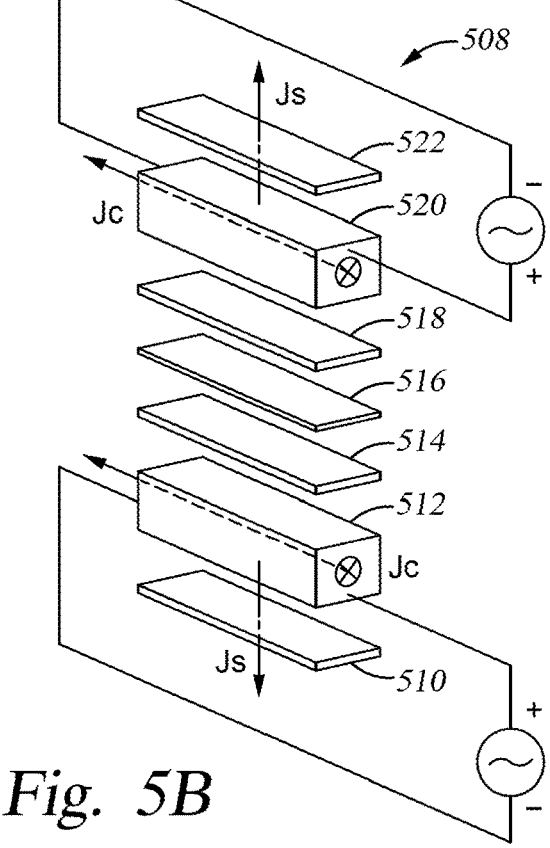
FIG. 5B is an exploded view of the spintronic device of the write head of FIG. 5A.

FIG. 5A is a schematic illustration of a write head 500 according to another embodiment. FIG. 5B is an exploded view of the spintronic device 508 of the write head 500 of FIG. 5A. The write head 500 includes a main pole 502, a trailing shield 504, and side shields 506. The spintronic device 508 is disposed between the main pole 502 and the trailing shield 504. The spintronic device 508 includes a first buffer layer 510, a first spin Hall layer 512, a first interlayer 514, an insulating layer 516, a second buffer layer 518, a second spin Hall layer 520, and a second interlayer 522.

The surfaces at the MFS have a width w extending in the "X" direction and a height h extending in the "Y" direction, while the individual layers of the spintronic device also have a depth d extending in the "Z" direction. The depth is the dimension into the head perpendicular to the MFS. The height is the dimension that extends between the main pole 502 and the trailing shield 504. The width is the dimension that is perpendicular to the height along the MFS. The spintronic device 508 is at the MFS as is the trailing shield 504, main pole 502, and side shields 506. In particular, the buffer layers 510, 518, the spin Hall layers 512, 520, the insulating layer 516, and the interlayers 514, 522 each has a surface at the MFS. The surfaces at the MFS have a width and a height while the individual layers of the spintronic device also have a depth.

As shown in FIGS. 5A and 5B, the buffer layers 510, 518, the spin Hall layers 512, 520, the insulating layer 516, and the interlayers 514, 522 all have the same depth and width though it is contemplated that the buffer layers 510, 518, the spin Hall layers 512, 520, the insulating layer 516, and the interlayers 514, 522 may have different widths and depths.

During operation, current (Jc) is injected into each Spin Hall layer and flows transverse to the plane. A separate current source is used to power the trailing shield 504 and the main pole 502. Spin accumulates on the top and bottom of each spin Hall layer 512, 520 from the SHE, which causes a torque on the trailing shield 504 and the main pole 502 and improves write-ability. The insulating layer 516 is used to separate the two stacks where a first stack is the first buffer layer 510, first spin Hall layer 512, and the first interlayer 514 while the second stack is the second buffer layer 518, the second spin Hall layer 520, and the second interlayer 522.

Figure 5C:
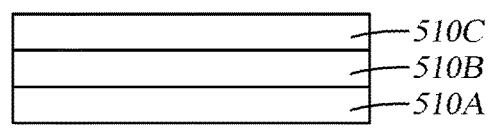
FIG. 5C is a schematic illustration of a multilayer buffer layer according to one embodiment.

In the embodiment of FIGS. 5A and 5B, the first buffer layer 510 may comprise materials from Groups B, C, D, E, F, G, and H. In one embodiment, the first buffer layer 510 may be a multilayer structure as shown in FIG. 5C where the lowermost layer 510A adjacent the main pole 502 comprises materials from Group D, E, or H; the middle layer 510B adjacent the lowermost layer 510A comprises materials from Group B, C, F, or G; and the uppermost layer 510C adjacent the first spin Hall layer 512 includes materials from Group G. In total, the spintronic device 508, and in particular the lowermost layer 510A, the middle layer 510B, and the uppermost layer 510C, fits within the write gap.

The first interlayer 514 extends out in the x and −x directions and is uniform to make an electrical connection whereas insulating layer 516 and buffer layer 518 also extend out and is also uniform. Both the insulating 516 and the second buffer layer 518 are nonconductive to prevent shunting. The first interlayer 514 may comprise materials from Groups B, C, F, or G. The first interlayer 514 should be less conductive to prevent shunting. The first interlayer 514 should have a width that is substantially equal to the width of the insulating layer 516 and the second buffer layer 518.

The first spin Hall layer 512 may comprise undoped BiSb or doped BiSbX, where the dopant is less than about 10 at. %, and where X is extracted from elements which do not readily interact with Bi, such as B, N, Al, Si, Ti, V, Cr, Fe, Ni, Cu, Ge, Y, Zr, Ru, Mo, Ag, Hf, Ta, W, or Ir or in alloy combinations with one or more of aforementioned elements, like CuAg, CuNi, RuGe, etc. The first spin Hall layer 512 may have a (012) crystal orientation.

The insulating layer 516 may comprise materials from Groups B, C, or F. As noted above, the insulating layer 516 may have a width that is substantially equal to the width of the first interlayer 514 and the second buffer layer 518.

The second buffer layer 518 may comprise materials from Groups B, C, F, or G. In one embodiment, the second buffer layer 518 and the insulating layer 516 are optional when the first interlayer 514 comprises materials from Group B or C and the first interlayer 514 is used to epitaxially grow (012) the second spin Hall layer 520.

The second spin Hall layer 520 may have a width that is less than the width of the first spin Hall layer 512 to be able to make an electrical connection. The second spin Hall layer 520 may comprise undoped BiSb or doped BiSbX, where the dopant is less than about 10 at. %, and where X is extracted from elements which do not readily interact with Bi, such as B, N, Al, Si, Ti, V, Cr, Fe, Ni, Cu, Ge, Y, Zr, Ru, Mo, Ag, Hf, Ta, W, or Ir or in alloy combinations with one or more of aforementioned elements, like CuAg, CuNi, RuGe, etc. The second spin Hall layer 520 may have a (012) crystal orientation.

Figure 5D:
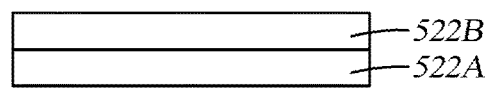
FIG. 5D is a schematic illustration of a multilayer interlayer according to one embodiment.

The second interlayer 522 may have a width substantially equal to the width of a lead used to power the device. The second interlayer 522 may comprise materials from Groups B, C, D, E, F, G, and H. In one embodiment, the second interlayer 522 may be a multilayer structure as shown in FIG. 5D where the lowermost layer 522A adjacent the second spin Hall layer 520 comprises materials from Group B, C, F, or G; and the uppermost layer 522B adjacent the trailing shield 504 includes materials from Groups D, E, or H.

FIG. 6A is a schematic illustration of a write head 600 according to another embodiment. FIG. 6B is an exploded view of the spintronic device 608 of the write head 600 of FIG. 6A. The write head 600 includes a main pole 602, a trailing shield 604, and side shields 606. The spintronic device 608 is disposed between the main pole 602 and the trailing shield 604. The spintronic device 608 includes an insulating layer 610, a buffer layer 612, a spin Hall layer 614, and an interlayer 616.

The surfaces at the MFS have a width w extending in the "X" direction and a height h extending in the "Y" direction, while the individual layers of the spintronic device also have a depth d extending in the "Z" direction. The depth is the dimension into the head perpendicular to the MFS. The height is the dimension that extends between the main pole 602 and the trailing shield 604. The width is the dimension that is perpendicular to the height along the MFS. The spintronic device 608 is at the MFS as is the trailing shield 604, main pole 602, and side shields 606. In particular, the buffer layer 612, the spin Hall layer 614, the insulating layer 610, and the interlayer 616 each has a surface at the MFS. The surfaces at the MFS have a width and a height while the individual layers of the spintronic device also have a depth.

As shown in FIGS. 6A and 6B, the buffer layer 612, the spin Hall layer 614, the insulating layer 610, and the interlayer 616 all have the same depth and width though it is contemplated that the buffer layer 612, the spin Hall layer 614, the insulating layer 610, and the interlayer 616 may have different widths and depths.

During operation, current (Jc) is injected into the Spin Hall layer 614 and flows transverse to the plane. The insulation layer 610 below the buffer layer 612 and in contact with the main pole 602 is used to stop torque from affecting the main pole 602. Spin accumulates on the top of the spin Hall layer 614 from the SHE, which causes a torque only in the trailing shield 504 and improves write-ability.

In the embodiment of FIGS. 6A and 6B, the buffer layer 612 may comprise materials from Group G. The interlayer 616 may comprise materials from Groups B, C, D, E, F, G, and H. In one embodiment, the interlayer 616 may be a multilayer structure as shown in FIG. 6C where the lowermost layer 616A adjacent the spin Hall layer 614 comprises materials from Group B, C, E, F, or G; and the uppermost layer 616B adjacent the trailing shield 604 includes materials from Groups D, E, or H.

The spin Hall layer 614 may comprise undoped BiSb or doped BiSbX, where the dopant is less than about 10 at. %, and where X is extracted from elements which do not readily interact with Bi, such as B, N, Al, Si, Ti, V, Cr, Fe, Ni, Cu, Ge, Y, Zr, Ru, Mo, Ag, Hf, Ta, W, or Ir or in alloy combinations with one or more of aforementioned elements, like CuAg, CuNi, RuGe, etc. The spin Hall layer 614 may have a (012) crystal orientation.

The insulating layer 610 may comprise materials from Groups B, C, D, E, F, G, and H. In one embodiment, the insulating layer 610 may be a multilayer structure as shown in FIG. 6D where the lowermost layer 610A adjacent the main pole 602 comprises materials from Group D, E or H; and the uppermost layer 610B adjacent the buffer layer 612 includes materials from Groups B, C, F, or G.

Figure 7A:
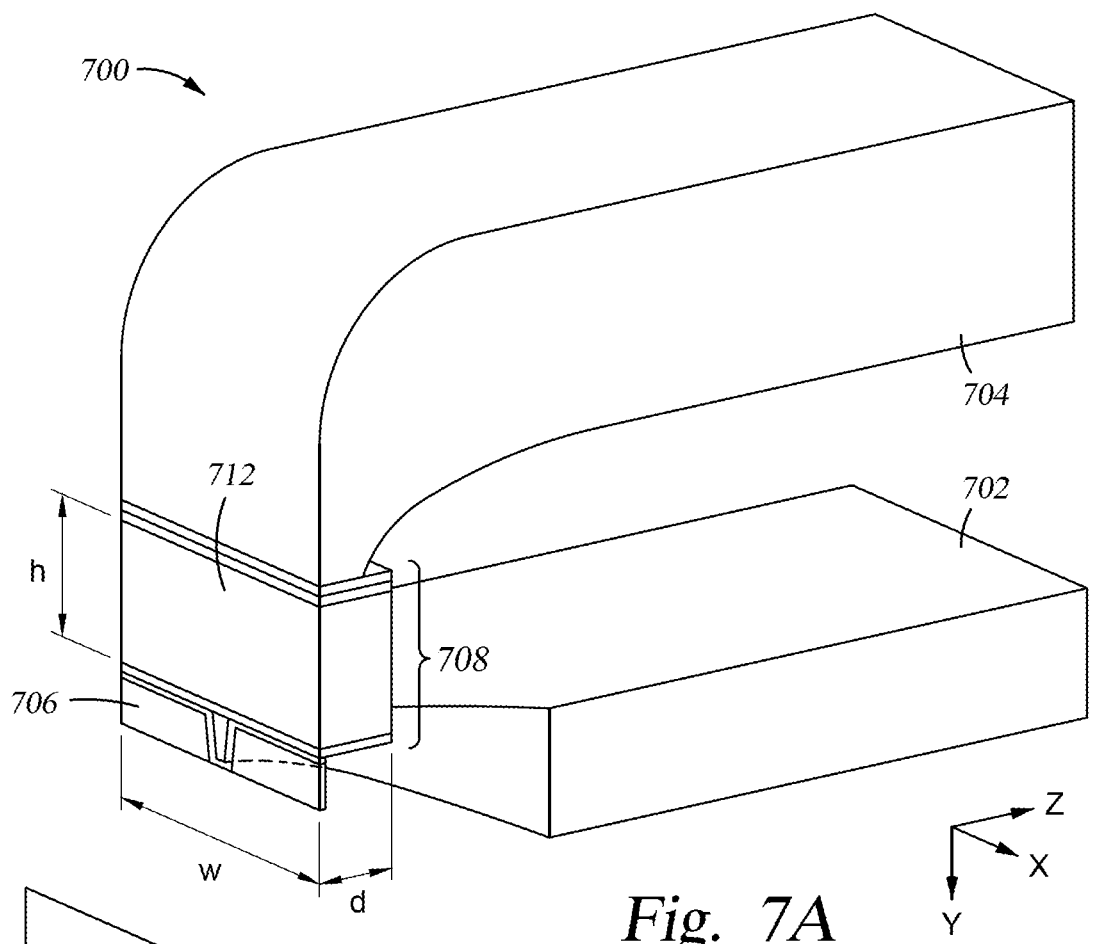
FIG. 7A is a schematic illustration of a write head according to another embodiment.
Figure 7B:
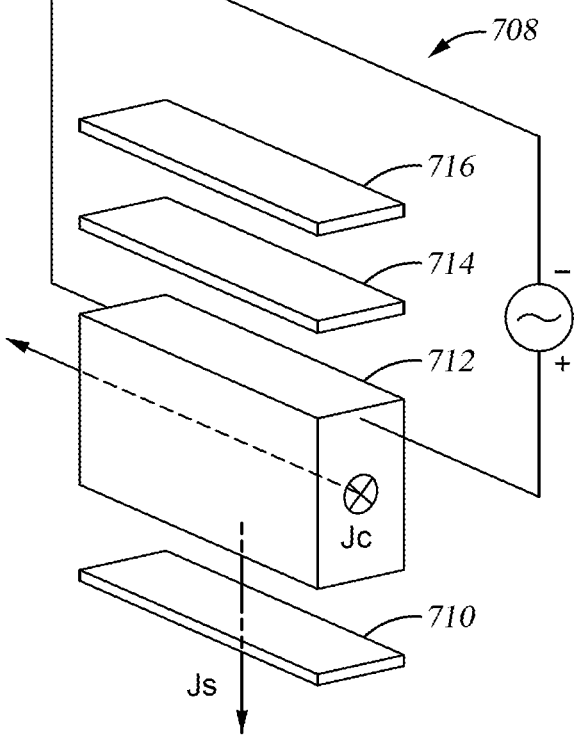
FIG. 7B is an exploded view of the spintronic device of the write head of FIG. 7A.

FIG. 7A is a schematic illustration of a write head 700 according to another embodiment. FIG. 7B is an exploded view of the spintronic device 708 of the write head 700 of FIG. 7A. The write head 700 includes a main pole 702, a trailing shield 704, and side shields 706. The spintronic device 708 is disposed between the main pole 702 and the trailing shield 704. The spintronic device 708 includes a buffer layer 710, a spin Hall layer 712, an interlayer 714, and an insulating layer 716.

The surfaces at the MFS have a width w extending in the "X" direction and a height h extending in the "Y" direction, while the individual layers of the spintronic device also have a depth d extending in the "Z" direction. The depth is the dimension into the head perpendicular to the MFS. The height is the dimension that extends between the main pole 702 and the trailing shield 704. The width is the dimension that is perpendicular to the height along the MFS. The spintronic device 708 is at the MFS as is the trailing shield 704, main pole 702, and side shields 706. In particular, the buffer layer 710, the spin Hall layer 712, the insulating layer 716, and the interlayer 714 each has a surface at the MFS. The surfaces at the MFS have a width and a height while the individual layers of the spintronic device also have a depth.

As shown in FIGS. 7A and 7B, the buffer layer 710, the spin Hall layer 712, the insulating layer 716, and the interlayer 714 all have the same depth and width though it is contemplated that the buffer layer 710, the spin Hall layer 712, the insulating layer 716, and the interlayer 714 may have different widths and depths.

During operation, current (Jc) is injected into the Spin Hall layer 712 and flows transverse to the plane. The insulation layer 716 above the interlayer 714 and in contact with the trailing shield 704 is used to stop torque from affecting the trailing shield 704. Spin accumulates on the bottom of the spin Hall layer 712 from the SHE, which causes a torque only in the main pole 702 and improves write-ability.

Figure 7C:
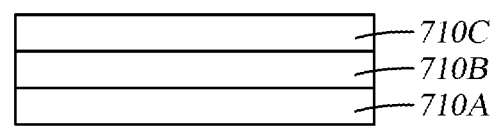
FIG. 7C is a schematic illustration of a multilayer buffer layer according to one embodiment.

In the embodiment of FIGS. 7A and 7B, the buffer layer 710 may comprise materials from Group B, C, D, E, F, G, and H. In one embodiment, the buffer layer 710 may be a multilayer structure as shown in FIG. 7C where the lowermost layer 710A adjacent the main pole 702 comprises materials from Group D, E, or H; the middle layer 710B adjacent the lowermost layer 710A comprises materials from Group B, C, F, or G; and the uppermost layer 710C adjacent the spin Hall layer 712 includes materials from Group G. The lowermost layer 710A, middle layer 710B, and uppermost layer 710C may have a height substantially equal to a height of the spin Hall layer 712.

The interlayer 714 may comprise materials from Groups B, C, E, F, or G. The spin Hall layer 712 may comprise undoped BiSb or doped BiSbX, where the dopant is less than about 10 at. %, and where X is extracted from elements which do not readily interact with Bi, such as B, N, Al, Si, Ti, V, Cr, Fe, Ni, Cu, Ge, Y, Zr, Ru, Mo, Ag, Hf, Ta, W, or Ir or in alloy combinations with one or more of aforementioned elements, like CuAg, CuNi, RuGe, etc. The spin Hall layer 712 may have a (012) crystal orientation.

Figure 7D:
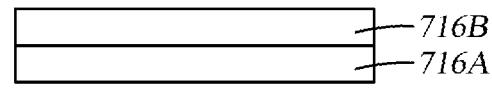
FIG. 7D is a schematic illustration of a multilayer insulating layer according to one embodiment.

The insulating layer 716 may have a width sufficient to not expose the spin Hall layer 712. The insulating layer 716 may comprise materials from Groups B, C, D, E, F, G, and H. In one embodiment, the insulating layer 716 may be a multilayer structure as shown in FIG. 7D where the lowermost layer 716A adjacent the interlayer 714 comprises materials from Group B, C, F, or G; and the uppermost layer 716B adjacent the trailing shield 704 includes materials from Groups D, E or H. The lowermost layer 716A and uppermost layer 716B has a height sufficient to not expose the spin Hall layer 712.

FIG. 8A is a schematic illustration of a write head 800 according to another embodiment. FIG. 8B is an exploded view of the spintronic device 808 of the write head 800 of FIG. 8A. The write head 800 includes a main pole 802, a trailing shield 804, and side shields 806. The spintronic device 808 is disposed between the main pole 802 and the trailing shield 804. The spintronic device 808 includes a buffer layer 810, a spin Hall layer 812, an interlayer 814, and an insulating layer 816.

The surfaces at the MFS have a width w extending in the "X" direction and a height h extending in the "Y" direction, while the individual layers of the spintronic device also have a depth d extending in the "Z" direction. The depth is the dimension into the head perpendicular to the MFS. The height is the dimension that extends between the main pole 802 and the trailing shield 804. The width is the dimension that is perpendicular to the height along the MFS. The buffer layer 810, and spin Hall layer 812, and the interlayer 814 of the spintronic device 808 are recessed from the MFS. The insulating layer 816, the trailing shield 804, main pole 802, and side shields 806 all have surfaces at the MFS.

As shown in FIGS. 8A and 8B, the buffer layer 810, the spin Hall layer 812, and the interlayer 814 all have the same depth and width though it is contemplated that the buffer layer 810, the spin Hall layer 812, and the interlayer 814 may have different widths and depths.

During operation, current (Jc) is injected into the spin Hall layer 812 and flows transverse to the plane. The insulation layer 816, in front of the buffer layer 810, the spin Hall layer 812, and the interlayer 814, protects the buffer layer 810, spin Hall layer 812, and interlayer 814 from reliability and diffusion issues. Spin accumulates on the top and the bottom of the spin Hall layer 812 from the SHE, which causes a torque in the main pole 802 and the trailing shield 804 and improves write-ability.

In the embodiment of FIGS. 8A and 8B, the buffer layer 810 may have a width that is sufficient to ensure the spin Hall layer 812 is not exposed. The buffer layer 810 may comprise materials from Group B, C, D, E, F, G, and H. In one embodiment, the buffer layer 810 may be a multilayer structure as shown in FIG. 8C where the lowermost layer 810A adjacent the main pole 802 comprises materials from Group D, E, or H; the middle layer 810B adjacent the lowermost layer 810A comprises materials from Group B, C, F, or G; and the uppermost layer 810C adjacent the spin Hall layer 812 includes materials from Group G. The lowermost layer 810A, middle layer 810B, and uppermost layer 810C has a height sufficient to ensure the spin Hall layer 812 is not exposed.

The interlayer 814 may comprise materials from Groups B, C, D, E, F, G, and H. In one embodiment, the interlayer 814 may be a multilayer structure as shown in FIG. 8D where the lowermost layer 814A adjacent the spin Hall layer 812 comprises materials from Group B, C, E, F, or G; and the uppermost layer 814B adjacent the training shield 804 includes materials from Groups D, E, or H.

The spin Hall layer 812 may comprise undoped BiSb or doped BiSbX, where the dopant is less than about 10 at. %, and where X is extracted from elements which do not readily interact with Bi, such as B, N, Al, Si, Ti, V, Cr, Fe, Ni, Cu, Ge, Y, Zr, Ru, Mo, Ag, Hf, Ta, W, or Ir or in alloy combinations with one or more of aforementioned elements, like CuAg, CuNi, RuGe, etc. The spin Hall layer 812 may have a (012) crystal orientation.

The insulating layer 816 may comprise materials from Groups B, C, or F.

FIG. 9A is a schematic illustration of a write head 900 according to another embodiment. FIG. 9B is an exploded view of the spintronic device 908 of the write head 900 of FIG. 9A. The write head 900 includes a main pole 902, a trailing shield 904, and side shields 906. The spintronic device 908 is disposed between the main pole 902 and the trailing shield 904. The spintronic device 908 includes a buffer layer 910, a spin Hall layer 912, an interlayer 914, and an insulating layer 916.

The surfaces at the MFS have a width w extending in the "X" direction and a height h extending in the "Y" direction, while the individual layers of the spintronic device also have a depth d extending in the "Z" direction. The depth is the dimension into the head perpendicular to the MFS. The height is the dimension that extends between the main pole 902 and the trailing shield 904. The width is the dimension that is perpendicular to the height along the MFS. The buffer layer 910, and spin Hall layer 912, and the interlayer 914 of the spintronic device 908 are recessed from the MFS. The insulating layer 916, the trailing shield 904, main pole 902, and side shields 906 all have surfaces at the MFS.

As shown in FIGS. 9A and 9B, the buffer layer 910, the spin Hall layer 912, and the interlayer 914 all have the same depth and width though it is contemplated that the buffer layer 910, the spin Hall layer 912, and the interlayer 914 may have different widths and depths. Additionally, the main pole 902 has a slanted surface 918 facing the buffer layer 910. Similarly, the trailing shield 904 has a slanted surface 920 facing the interlayer 914.

During operation, current (Jc) is injected into the spin Hall layer 912 and flows transverse to the plane. The insulation layer 916, in front of the buffer layer 910, the spin Hall layer 912, and the interlayer 914, protects the buffer layer 910, spin Hall layer 912, and interlayer 914 from reliability and diffusion issues. Spin accumulates on the top and the bottom of the spin Hall layer 912 from the SHE, which causes a torque in the main pole 902 and the trailing shield 904 and improves write-ability.

In the embodiment of FIGS. 9A and 9B, the buffer layer 910 may comprise materials from Group B, C, D, E, F, G, and H. In one embodiment, the buffer layer 910 may be a multilayer structure as shown in FIG. 9C where the lowermost layer 910A adjacent the main pole 902 comprises materials from Group D, E or H; the middle layer 910B adjacent the lowermost layer 910A comprises materials from Group B, C, F, or G; and the uppermost layer 910C adjacent the spin Hall layer 912 includes materials from Group G.

Due to the slanted surface 918, the buffer layer 910 may be amorphous. The lowermost layer 910A, the middle layer 910B, and the uppermost layer 910C have a height sufficient to ensure the spin Hall layer 912 is not exposed The interlayer 914 may comprise materials from Groups B, C, D, E, F, G, and H. In one embodiment, the interlayer 914 may be a multilayer structure as shown in FIG. 9D where the lowermost layer 914A adjacent the spin Hall layer 912 comprises materials from Group B, C, F, or G; and the uppermost layer 914B adjacent the training shield 904 includes materials from Groups D, E, or H. The lowermost layer 914A and the uppermost layer 914B have a height sufficient to ensure the spin Hall layer 912 is not exposed.

The spin Hall layer 912 may comprise undoped BiSb or doped BiSbX, where the dopant is less than about 10 at. %, and where X is extracted from elements which do not readily interact with Bi, such as B, N, Al, Si, Ti, V, Cr, Fe, Ni, Cu, Ge, Y, Zr, Ru, Mo, Ag, Hf, Ta, W, or Ir or in alloy combinations with one or more of aforementioned elements, like CuAg, CuNi, RuGe, etc. The spin Hall layer 912 may have a (012) crystal orientation.

The insulating layer 916 may comprise materials from Groups B, C, or F.

By utilizing a spintronic device having at least one spin Hall layer, at least one buffer layer, and at least one interlayer, the SHE can be improved to inject spin current to either the main pole or the trailing shield or both. The spintronic device improves a write head's write-ability with a torque experienced by the main pole and the trailing shield and magnetizing the main pole and trailing shield. The buffer layer and interlayer function as SHE shunt blocking between the spin Hall layer and the main pole as well as between the spin Hall layer and the trailing shield.

In one embodiment, a magnetic recording head comprises: a main pole; a trailing shield; and a spintronic device disposed between the main pole and the trailing shield. The spintronic device includes: a buffer layer disposed over the main pole, wherein the buffer layer comprises materials selected from the group consisting of Group B, Group C, Group D, Group E, Group F, Group G, or Group H; a spin Hall layer disposed over the buffer layer, wherein the spin Hall layer comprises undoped BiSb or doped BiSbX where X is a dopant; and an interlayer disposed over the spin Hall layer, wherein the interlayer comprises materials selected from the group consisting of Groups B, C, D, E, F, G, and H. Group B comprises face centered cubic (FCC) oxide materials. Group C comprises materials that can be deposited as amorphous to nanocrystalline thin films depending upon deposition conditions with a resistivity of greater than 100 micro ohm-cm. Group D comprises nonmagnetic Heusler materials including $Fe_2VAl$, $Cr_2CoAl$, $CoTiSb$, $Mn_2VSi$, $V_2Al$, $[Mn_{0.5}Co_{0.5}]_2VAl$, $[Mn_{0.75}Co_{0.25}]_2VSi$, CoMnNbAl, CoZrFeAl, and Ti2MnAl. Group E comprises crystalline high polarization layers using magnetic alloys or Heusler alloys that have large spin polarizations and do not readily mix with a spin Hall layer. Group F comprises amorphous nonmagnetic high resistive electrical shunt block layers that do not promote strong (012) BiSbX texture or growth. Group G comprises any metal amorphous or ceramic amorphous material with a nearest neighbor x-ray diffraction peak in a 2.19 A to 2.02 A d-spacing range. Group H comprises high perpendicular magnetic anisotropy (PMA) materials that can be amorphous or crystalline materials. Group E comprises one or more of the following: $Co_2MnSb$, CoFeX, NiFeX (X=Si, Al, Mn, or Ge), CoFe, NiFe, $Co_2MnGe$, CoMnSb, NiMnSb, $Co_2FeGe$, $Co_2MnSn$, and $Co_2MnFeGe$. Group F comprises $SiO_2$, $Al_2O_3$, SiN, AlN, SiC, SiCrOx, NiX, Fex, or Cox, where X is one or more of the following: Fe, Co, Ni, Ta, Hf, W, Ir, Pt, Ti, Zr, N, Ru, Ge and B. Group G comprises nonmagnetic and magnetic materials from Group A, D, or E which are laminated or alloyed with one or more elements of: Cu, Ag, Ge, Al, Mg, Si, Mn, Ni, Co, Mo, Zr, Y, Bi, Hf, Ta, W, Ir, Pt, Ti, or B; wherein Group A comprises body centered cubic (BCC) materials. Group A comprises V, $V_3Al$, $Mn_3Al$, Nb, Mo, W, Ta, $WTi_{50}$, or a BCC material used in combination with (100) textured layers. Group A comprises Cr, RuAl, IrAl, CoAl, NiAl, CrMo, or CrX where X and is selected from Ru, Ti, W, and Mo. Group G comprises amorphous or nanocrystalline alloys with a-Ge, a-NiP and one or more elements of: Cu, Ag, Ge, Al, Mg, Si, Mn, Ni, Co, Mo, Zr, Y, Bi, Hf, Ta, W, Ir, Pt, Ti, or B to promote a strong (012) BiSb texture. Group H comprises amorphous rare-earth transition metals (RE-TM) that have high PMA. Group H comprises TbFeCo, TbFeB, Nd, Pr, Sm(Fe,Co)B, or CoZrTaB. Group H comprises: polycrystalline stacks of Co/Pt, Co/Pd, CoFe/Pt, Co/Tb, or CoFe/Tb where "/" denotes separation of layers in a multilayer stack; or single layer PMA materials of CoPt, CoPtCr, CoFePt, and FePt with high Ku with an amorphous high polarizing layer next to the spin Hall layer for (012) texture growth. Group B comprises FeO, CoO, NiO, ZrO, MgO, TiO, MgTiO, or MnO. The main pole has a first surface disposed at a media facing surface (MFS), wherein the trailing shield has a second surface disposed at the MFS, and the magnetic head further comprises a first insulating layer disposed between the main pole and the trailing shield and having a third surface disposed at the MFS, wherein the spintronic device is disposed between the main pole and the trailing shield and recessed from the MFS. A magnetic recording device comprising the magnetic head is also contemplated.

In another embodiment, a magnetic head comprises: a main pole; a trailing shield; and a spintronic device disposed between the main pole and the trailing shield, wherein the spintronic device comprises: a first buffer layer; a first spin Hall layer disposed over the buffer layer, wherein the first spin Hall layer comprises undoped BiSb or doped BiSbX where X is a dopant; a first interlayer disposed on the first spin Hall layer; an insulating layer disposed on the first interlayer; a second buffer layer disposed on the insulating layer; a second spin Hall layer disposed over the second buffer layer, wherein the second spin Hall layer comprises undoped BiSb or doped BiSbX where X is a dopant; and a second interlayer disposed on the second spin Hall layer. The first buffer layer comprises a multilayer structure. The second interlayer comprises a multilayer structure. The spin Hall layer is recessed from a media facing surface. A magnetic recording device comprising the magnetic head is also contemplated.

In another embodiment, a magnetic head comprises: a main pole; a trailing shield; a spintronic device disposed between the main pole and the trailing shield, wherein the spintronic device comprises: a buffer layer; a spin Hall layer disposed over the buffer layer, wherein the spin Hall layer comprises undoped BiSb or doped BiSbX where X is a dopant; and a interlayer disposed on spin Hall layer; and an insulating layer disposed between the spintronic device and either the main pole or the trailing shield. The buffer layer and the interlayer each comprise multiple layers. A magnetic recording device comprising the magnetic head of is also contemplated.

While the foregoing is directed to embodiments of the present disclosure, other and further embodiments of the disclosure may be devised without departing from the basic scope thereof, and the scope thereof is determined by the claims that follow.

What is claimed is:

1. A magnetic head, comprising:
   a main pole;
   a shield; and
   a spintronic device disposed between the main pole and the shield, wherein the spintronic device includes:
      a buffer layer disposed over the main pole, wherein the buffer layer comprises materials selected from the group consisting of Group B, Group C, Group D, Group E, Group F, Group G, or Group H, wherein:
         Group B comprises face centered cubic (FCC) oxide materials;
         Group C comprises materials that can be deposited as amorphous to nanocrystalline thin films depending upon deposition conditions with a resistivity of greater than 100 micro ohm-cm;
         Group D comprises nonmagnetic Heusler materials including iron vanadium aluminum ($Fe_2VAl$), chromium cobalt aluminum ($Cr_2CoAl$), cobalt titanium antimony (CoTiSb), manganese vanadium silicon ($Mn_2VSi$), vanadium aluminum ($V_2Al$), manganese cobalt vanadium aluminum ($[Mn_{0.5}Co_{0.5}]_2VAl$), manganese cobalt vanadium silicon ($[Mn_{0.75}Co_{0.25}]_2VSi$), cobalt manganese niobium aluminum (CoMnNbAl), cobalt zirconium iron aluminum (CoZrFeAl), and titanium manganese aluminum ($Ti_2MnAl$);
         Group E comprises crystalline high polarization layers using magnetic alloys or Heusler alloys that have large spin polarizations and do not readily mix with a spin Hall layer;
         Group F comprises amorphous nonmagnetic high resistive electrical shunt block layers that do not promote a strong (012) crystalline texture or crystalline growth of doped bismuth antimony (BiSbX), where X is a dopant;
         Group G comprises any metal amorphous or ceramic amorphous material with a nearest neighbor x-ray diffraction peak in a 2.19 Å to 2.02 Å d-spacing range, where a d-spacing range is an interplanar distance;
         Group H comprises high perpendicular magnetic anisotropy (PMA) materials that can be amorphous or crystalline materials;
      a spin Hall layer disposed over the buffer layer, wherein the spin Hall layer comprises undoped bismuth antimony (BiSb) or doped BiSbX where X is a dopant; and
      an interlayer disposed over the spin Hall layer, wherein the interlayer comprises materials selected from the group consisting of Groups B, C, D, E, F, G, and H.

2. The magnetic head of claim 1, wherein Group E comprises one or more of the following: cobalt manganese antimony ($Co_2MnSb$), cobalt iron (CoFeX), nickel iron (NiFeX) (X=silicon (Si), aluminum (Al), manganese (Mn), or germanium (Ge)), cobalt iron (CoFe), nickel iron (NiFe), cobalt manganese germanium ($Co_2MnGe$), cobalt manganese antimony (CoMnSb), nickel manganese antimony (NiMnSb), cobalt iron germanium ($Co_2FeGe$), cobalt manganese tin ($Co_2MnSn$), and cobalt manganese iron germanium ($Co_2MnFeGe$).

3. The magnetic head of claim 1, wherein Group F comprises silicon dioxide ($SiO_2$), aluminum oxide ($Al_2O_3$), silicon nitride (SiN), aluminum nitride (AlN), silicon carbide (SiC), silicon chromium oxygen (SiCrO$_x$), nickel (NiX), iron (FeX), or cobalt (CoX), where X is one or more of the following: iron (Fe), cobalt (Co), nickel (Ni), tantalum (Ta), hafnium (Hf), tungsten (W), iridium (Ir), platinum (Pt), titanium (Ti), zirconium (Zr), nitrogen (N), ruthenium (Ru), germanium (Ge), and boron (B).

4. The magnetic head of claim 1, wherein Group G comprises nonmagnetic and magnetic materials from Group A, D, or E which are laminated or alloyed with one or more elements of: copper (Cu), silver (Ag), germanium (Ge), aluminum (Al), magnesium (Mg), silicon (Si), manganese (Mn), nickel (Ni), cobalt (Co), molybdenum (Mo), zirconium (Zr), yttrium (Y), bismuth (Bi), hafnium (Hf), tantalum (Ta), tungsten (W), iridium (Ir), platinum (Pt), titanium (Ti), or boron (B); wherein Group A comprises body centered cubic (BCC) materials.

5. The magnetic head of claim 4, wherein Group A comprises vanadium (V), vanadium aluminum (V$_3$Al), manganese aluminum (Mn$_3$Al), niobium (Nb), Mo, W, Ta, tungsten titanium (WTi$_{50}$), or a BCC material used in combination with (100) crystalline textured layers.

6. The magnetic head of claim 4, wherein Group A comprises chromium (Cr), ruthenium aluminum (RuAl), iridium aluminum (IrAl), cobalt aluminum (CoAl), nickel aluminum (NiAl), chromium molybdenum (CrMo), or chromium (CrX), where X is selected from ruthenium (Ru), Ti, W, and Mo.

7. The magnetic head of claim 6, wherein Group H comprises terbium iron cobalt (TbFeCo), terbium iron boron (TbFeB), neodymium (Nd), praseodymium (Pr), samarium iron cobalt boron (Sm(Fe,Co)B), or cobalt zirconium tantalum boron (CoZrTaB).

8. The magnetic head of claim 1, wherein Group G comprises amorphous or nanocrystalline alloys with amorphous germanium (a-Ge), amorphous nickel phosphorus (a-NiP) and one or more elements of: copper (Cu), silver (Ag), germanium (Ge), aluminum (Al), magnesium (Mg), silicon (Si), manganese (Mn), nickel (Ni), cobalt (Co), molybdenum (Mo), zirconium (Zr), yttrium (Y), bismuth (Bi), hafnium (Hf), tantalum (Ta), tungsten (W), iridium (Ir), platinum (Pt), titanium (Ti), or boron (B) to promote a strong (012) BiSb texture.

9. The magnetic head of claim 1, wherein Group H comprises amorphous rare-earth transition metals (RE-TM) that have high PMA.

10. The magnetic head of claim 1, wherein Group H comprises:
polycrystalline stacks of cobalt/platinum (Co/Pt), cobalt/palladium (Co/Pd), cobalt iron/platinum (CoFe/Pt), cobalt/terbium (Co/Tb), or cobalt iron/terbium (CoFe/Tb), where "/" denotes separation of layers in a multilayer stack; or
single layer PMA materials of cobalt platinum (CoPt), cobalt platinum chromium (CoPtCr), cobalt iron platinum (CoFePt), and iron platinum (FePt) with high Ku with an amorphous high polarizing layer next to the spin Hall layer for (012) texture growth.

11. The magnetic head of claim 1, wherein Group B comprises iron(II) oxide (FeO), cobalt(II) oxide (CoO), nickel(II) oxide (NiO), zirconium oxide (ZrO), magnesium oxide (MgO), titanium oxide (TiO), magnesium titanate (MgTiO), or manganese(II) oxide (MnO).

12. The magnetic head of claim 1, wherein the main pole has a first surface disposed at a media facing surface (MFS), wherein the shield has a second surface disposed at the MFS, and the magnetic head further comprises a first insulating layer disposed between the main pole and the shield and having a third surface disposed at the MFS, wherein the spintronic device is disposed between the main pole and the shield and recessed from the MFS.

13. A magnetic recording device comprising the magnetic head of claim 1.

14. A magnetic head, comprising:
a main pole;
a shield; and
a spintronic device disposed between the main pole and the shield, wherein the spintronic device comprises:
a first buffer layer;
a first spin Hall layer disposed over the buffer layer, wherein the first spin Hall layer comprises undoped bismuth antimony (BiSb) or doped bismuth antimony (BiSbX), where X is a dopant;
a first interlayer disposed on the first spin Hall layer;
an insulating layer disposed on the first interlayer;
a second buffer layer disposed on the insulating layer;
a second spin Hall layer disposed over the second buffer layer, wherein the second spin Hall layer comprises undoped BiSb or doped BiSbX, where X is a dopant; and
a second interlayer disposed on the second spin Hall layer.

15. The magnetic head of claim 14, wherein the first buffer layer comprises a multilayer structure.

16. The magnetic head of claim 14, wherein the second interlayer comprises a multilayer structure.

17. A magnetic recording device comprising the magnetic head of claim 14.

18. A magnetic head, comprising:
a main pole;
a shield;
a spintronic device disposed between the main pole and the shield, wherein the spintronic device comprises:
a buffer layer;
a spin Hall layer disposed over the buffer layer, wherein the spin Hall layer comprises undoped bismuth antimony (BiSb) or doped bismuth antimony (BiSbX), where X is a dopant; and
an interlayer disposed on first spin Hall layer; and
an insulating layer disposed between the spintronic device and either the main pole or the shield.

19. The magnetic head of claim 18, wherein the buffer layer and the interlayer each comprise multiple layers.

20. The magnetic head of claim 18, wherein the spin Hall layer is recessed from a media facing surface.

21. A magnetic recording device comprising the magnetic head of claim 18.

* * * * *